(12) United States Patent
Brown et al.

(10) Patent No.: US 8,458,240 B2
(45) Date of Patent: Jun. 4, 2013

(54) SIGNAL PROCESSING WITH FAST S-TRANSFORMS

(75) Inventors: Robert Brown, Ille des Soeurs (CA); M. Louis Lauzon, Calgary (CA); Richard Frayne, Calgary (CA)

(73) Assignee: UTI Limited Partnership, Calgary, Alberta (CA)

( * ) Notice: Subject to any disclaimer, the term of this patent is extended or adjusted under 35 U.S.C. 154(b) by 1029 days.

(21) Appl. No.: 12/482,237

(22) Filed: Jun. 10, 2009

(65) Prior Publication Data

US 2010/0191792 A1  Jul. 29, 2010

Related U.S. Application Data

(60) Provisional application No. 61/060,315, filed on Jun. 10, 2008.

(51) Int. Cl.
*G06F 17/14* (2006.01)
*G06F 15/00* (2006.01)

(52) U.S. Cl.
USPC ............ 708/400; 708/401; 708/404; 708/407

(58) Field of Classification Search
None
See application file for complete search history.

(56) References Cited

U.S. PATENT DOCUMENTS

| | | | |
|---|---|---|---|
| 2003/0212491 A1 | 11/2003 | Mitchell et al. | 702/1 |
| 2007/0027657 A1 * | 2/2007 | Pinnegar et al. | 702/189 |

OTHER PUBLICATIONS

Brown and Frayne, "A fast discrete S-transform for biomedical signal processing," Conference of the IEEE Engineering in Medicine and Biology Society, pp. 2586-2589, 2008.
Brown et al., "Distributed vector processing of a new local multiscale fourier transform for medical imaging applications," *IEEE Transactions on Medical Imaging*, 24:689-91, 2005.
International Search Report and Written Opinion, issued in International Application No. PCT/IB2009/006116, mailed Nov. 24, 2009.
Stockwell, "A basis for efficient representation of the S-transform," *Digital Signal Processing*, 17:371-93, 2007.
Stockwell, "Why use the S-transform?" Field Institute Communications, pp. 1-31, 2009.

* cited by examiner

*Primary Examiner* — Scott Sun
(74) *Attorney, Agent, or Firm* — Fogarty, L.L.C.

(57) ABSTRACT

The ability to examine the frequency content of a signal is critical in a variety of fields, and many techniques have been proposed to fill this need, including the Fourier and wavelet family of transforms. One of these, the S-transform, is a Fourier based transform that provides simultaneous time and frequency information similar to the wavelet transform but uses sinusoidal basis functions to produce true frequency and globally referenced phase measurements. It has been shown to be useful in several medical imaging applications but its use is limited due to high computational requirements of the original, continuous form. The described embodiments include a general framework for describing linear time-frequency transforms, using the Fourier, wavelet and S-transforms as examples. As an illustration of the utility of this formalism, a fast discrete S-transform algorithm is developed that has the same computational complexity as the fast Fourier transform.

17 Claims, 17 Drawing Sheets

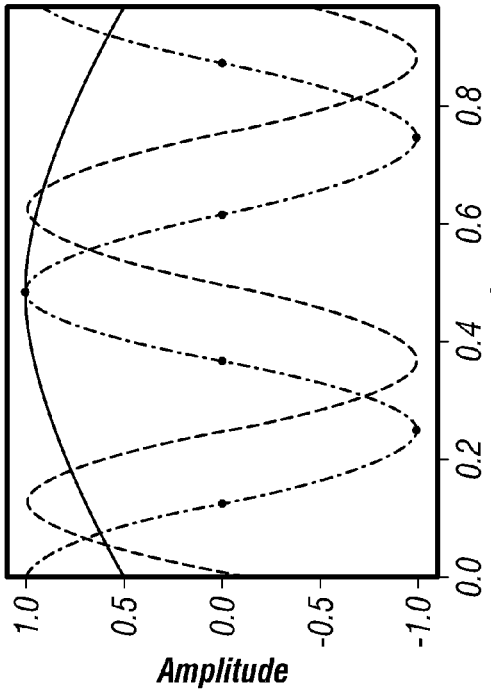
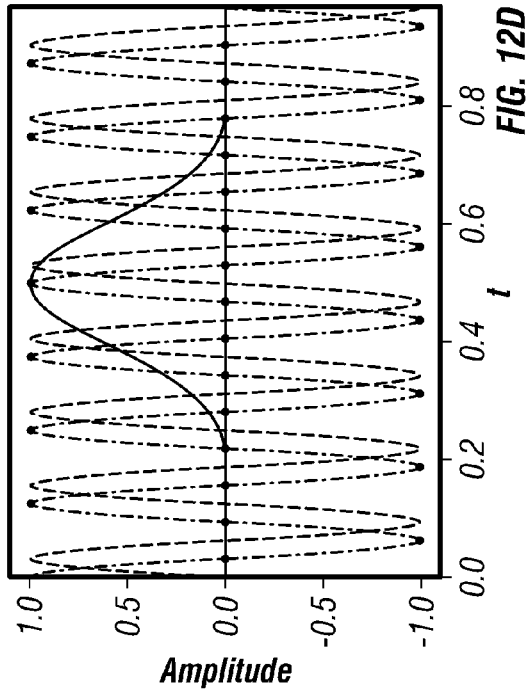
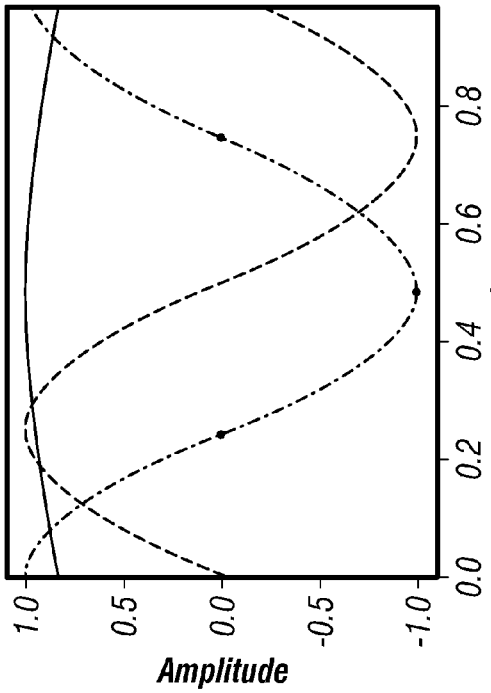
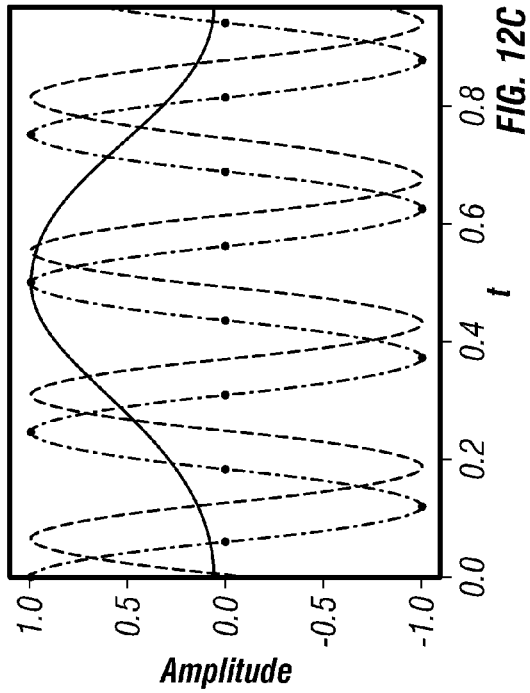

SIGNAL PROCESSING WITH FAST S-TRANSFORMS

CROSS-REFERENCE TO RELATED APPLICATIONS

This application claims priority to U.S. Provisional Application No. 61/060,315 filed Jun. 10, 2008, the entire text of which disclosure is specifically incorporated by reference herein without disclaimer.

BACKGROUND OF THE INVENTION

1. Field of the Invention

The present invention relates generally to the fields of signal processing. More particularly, it concerns methods and systems for signal processing with fast S-transforms.

2. Description of the Related Art

The ability to detect the frequency content of a signal is a desirable capability in diverse applications from electrical engineering to neuroscience. Many transforms for accomplishing this task by transforming signals of one or more dimensions into frequency or frequency-analogue spaces are known to those of skill in the art.

While the original Fourier transform (FT) is an extremely important signal and image analysis tool, it assumes that a signal is stationary, i.e., that the frequency content is constant at all times in a signal, or at all locations in an image. Since most interesting signals are non-stationary, a series of techniques have been developed to characterize signals with dynamic frequency content. These are the foundation of the field of time-frequency analysis.

A simple approach to the problem of non-stationary signal analysis is the short-time Fourier transform (STFT). In this technique changes in frequency over time are captured using a window function to provide time localization. However, the choice of window function represents a compromise. Narrower windows provide better time resolution but poorer frequency resolution, while wider windows provide the converse. Ideally, the window width is chosen to produce the best representation of particular features of interest in the signal, but this requires a priori knowledge.

The wavelet transform (WT), which has been applied to a wide variety of signal processing problems, improves on the STFT by introducing the concept of progressive resolution. The WT provides the equivalent of finer time resolution at high frequencies and finer frequency resolution at low frequencies. However, the WT does not measure frequency but only an analogue, called scale. Additionally, the WT provides either no phase information, or phase measurements which are all relative to different local references. This is in contrast to the conventional concept of phase, as provided by the FT, where all phase measurements are relative to a global reference.

The S-transform (ST) exhibits the globally referenced phase and true frequency measurements of the FT and STFT, as well as the progressive resolution of the WT. This combination of desirable features have shown promise in a wide variety of applications, including, for example, detecting abnormalities in the heart, identifying genetic abnormalities in brain tumors, analyzing electroencephalograms, transmitting medical images, characterizing the behavior of liquid crystals, detecting disturbances in electrical power distribution networks monitoring high altitude wind patterns, and detecting gravitational waves. However, while very efficient methods have been developed for calculating the FT and WT, the computational demands of the ST have limited its utility.

SUMMARY OF THE INVENTION

From the foregoing discussion, it should be apparent that a need exists for systems and methods for signal processing with fast S-transforms.

A method for signal processing with fast S-transforms is presented. In one embodiment, the method includes performing a general time-frequency transform on a dataset associated with a signal according to a fast S-transform having a computational complexity of O(N log N), where N is the total number of samples in the acquired-dataset. In a further embodiment, the method may include performing the general time-frequency transform on the dataset associated with the signal according to a fast S-transform having a resource usage of O(N). In still a further embodiment of the method, the dataset is associated with a multi-dimensional signal.

In one embodiment, the method includes receiving a signal, sampling the signal to generate an signal dataset, transforming the signal dataset representation with a fast Fourier transform to obtain the frequency-domain representation, dividing the frequency-domain into sub-regions, multiplying each sub-region by a window function, inverse transforming each sub-region individually with an inverse fast Fourier transform, arranging the inverse transformed sub-regions to form a representation of the frequency content and changes in frequency content along each axis of the signal dataset, and generating an output comprising the representation of the time-frequency content. The method may further include dividing the frequency domain into a plurality of overlapping sub-regions.

In another embodiment, the method may include receiving a signal, sampling the signal to generate an signal dataset, transforming the signal dataset with a fast Fourier transform to obtain a frequency-domain representation, dividing the frequency-domain into a high-frequency sub-region and a low-frequency sub-region, generating a second dataset from an inverse fast Fourier transform of the high-frequency sub-region, multiplying the second dataset by a complex sinusoid of a predetermined frequency and with the same number of dimensions as the signal dataset to form a third dataset, selecting a first portion of the third dataset, multiplying the selected portion of the third dataset by a window function, and computing a sum of the results of multiplying the selected portion of the third dataset by the window function to obtain the frequency measurement at a predetermined sample location in the signal dataset. The method may further include repeating these steps with a second selected portion of the third data set to obtain the frequency measurements at one or more additional frequencies the signal dataset.

In one embodiment, the method may include selecting the low frequency sub-region from as the frequency-domain data, generating a second dataset from an inverse fast Fourier transform of the low-frequency sub-region, multiplying the second dataset by a complex sinusoid of a predetermined frequency and with the same number of dimensions as the signal dataset to form a fourth dataset, selecting a first portion of the fourth dataset, multiplying the selected portion of the fourth dataset by a window function, and computing a sum of the results of multiplying the selected portion of the fourth dataset by the window function to obtain the frequency measurement at a predetermined sample location in the signal dataset, repeating steps with a second selected portion of the fourth data set to obtain the frequency measurements at one or more additional frequencies the signal dataset, and arranging the resultant data to form a representation of the frequency content and changes in frequency content along each axis of the acquired dataset.

A system for signal processing with fast S-transforms is also presented. In one embodiment, the system includes a signal processor suitably configured to perform a general time-frequency transform on a dataset associated with a signal according to a fast S-transform having a computational complexity of O(N log N) and resource usage of O(N), where N is the total number of samples in the acquired-dataset. In a further embodiment, signal processor is further configured to performing the general time-frequency transform on the dataset associated with the signal according to a fast S-transform having a resource usage of O(N). Additionally, the dataset is associated with a multi-dimensional signal.

In a further embodiment, the system may include a receiver coupled to the signal processor. The receiver may receive a signal, and sample the signal to generate an signal dataset.

In one embodiment, the signal processor may be configured to transform the signal dataset representation with a fast Fourier transform to obtain the frequency-domain representation, divide the frequency-domain into sub-regions, multiply each sub-region by a window function, inverse transform each sub-region individually with an inverse fast Fourier transform, arrange the inverse transformed sub-regions to form a representation of the frequency content and changes in frequency content along each axis of the signal dataset, and generate an output comprising the representation of the frequency content. Additionally, the signal processor may divide the frequency domain into a plurality of overlapping sub-regions.

In another embodiment, the signal processor may be configured to transform the signal dataset with a fast Fourier transform to obtain a frequency-domain representation, divide the frequency-domain into a high-frequency sub-region and a low-frequency sub-region, generate a second dataset from an inverse fast Fourier transform of the high-frequency sub-region, multiply the second dataset by a complex sinusoid of a predetermined frequency and with the same number of dimensions as the signal dataset to form a third dataset, select a first portion of the third dataset, multiply the selected portion of the third dataset by a window function, and compute a sum of the results of multiplying the selected portion of the third dataset by the window function to obtain the frequency measurement at a predetermined sample location in the signal dataset. In such an embodiment, the signal processor may repeat these steps with a second selected portion of the third data set to obtain the frequency measurements at one or more additional frequencies the signal dataset.

In still a further embodiment, the signal processor may select the low frequency sub-region from as the frequency-domain data, generate a second dataset from an inverse fast Fourier transform of the low-frequency sub-region, multiply the second dataset by a complex sinusoid of a predetermined frequency and with the same number of dimensions as the signal dataset to form a fourth dataset, select a first portion of the fourth dataset, multiply the selected portion of the fourth dataset by a window function, and compute a sum of the results of multiplying the selected portion of the fourth dataset by the window function to obtain the frequency measurement at a predetermined sample location in the signal dataset, repeat steps with a second selected portion of the fourth data set to obtain the frequency measurements at one or more additional frequencies the signal dataset, and arrange the resultant data to form a representation of the frequency content and changes in frequency content along each axis of the acquired dataset.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE FIGURES

The following drawings form part of the present specification and are included to further demonstrate certain aspects of the present invention. The invention may be better understood by reference to one or more of these drawings in combination with the detailed description of specific embodiments presented herein.

FIGS. 12A-D illustrate embodiments of S-transform kernels and windows in accordance with the present embodiments;

DETAILED DESCRIPTION

Figure 1:
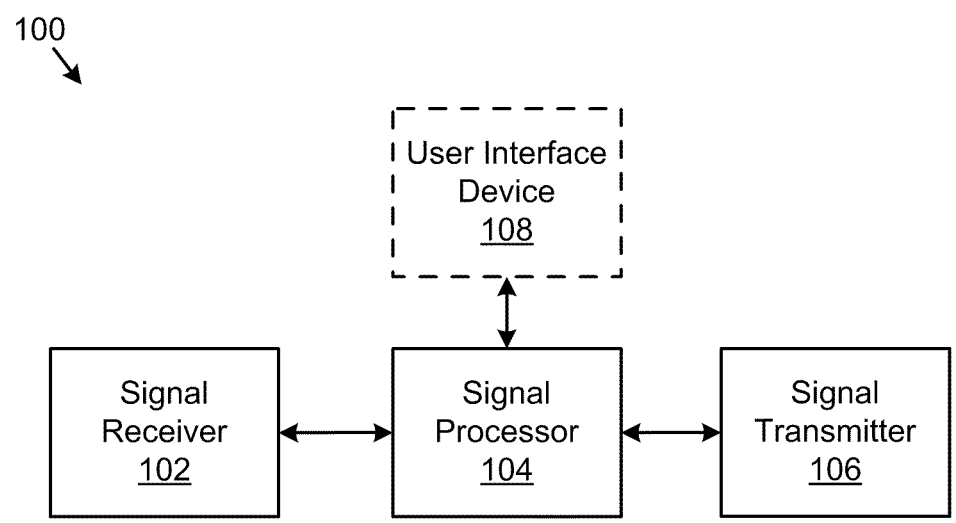
FIG. 1 is a schematic block diagram illustrating one embodiment of a system for signal processing with fast S-transforms.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

The present embodiments describe a general Fourier Family transform (GFT), which may describe linear transforms based on the complex sinusoid, including the FT, STFT and ST. Additionally, a fast algorithm for calculating the GFT is described that is much more computationally efficient than existing methods for calculating the ST, making the computation of the ST more practical. This greatly improved computational efficiency will improve existing techniques as well as allowing more advanced applications than have previously been investigated. Certain benefits of the described embodiments include the ability to analyze longer signals and larger images, as well as transform data with three or more dimensions, e.g., volumetric data from tomographic medical imaging techniques. As described below, the present embodiments may be extended to higher dimensional data.

The terminology used in the literature may inconsistent between the S-transform, wavelet and Fourier transforms. As used herein, the term "continuous" refers to transforms expressed as integrals. The term "discrete" refers to formulations using summation. The term "one-to-one" refers to discrete transforms that are minimally sampled: i.e., the transform of an N-point signal produces an N-point spectrum. This may reduce the memory requirements of the algorithm and also implies that each unique signal is transformed into a unique spectrum, and vice versa. The term "fast" transform means an algorithm for calculating a discrete, one-to-one transform that eliminates remaining redundancies to achieve a reduction in computational complexity.

The present embodiments may involve several transforms, each of which having several variants. The continuous Fourier transform is commonly used in analytic time-frequency analysis. The discrete Fourier transform (DFT) may include one-to-one transform. Alternatively, a fast Fourier transform (FFT) may be implemented which offers O(N log N) computational complexity as compared to O($N^2$) complexity for the DFT. The short-time Fourier transform (STFT) may have continuous and discrete formulations. The latter may be either one-to-one or not, and fast algorithms may exist to calculate the STFT efficiently. Though there is a true continuous wavelet transform, the term is often used to describe a discrete approximation. In the present embodiments, the wavelet transform refers to a discrete wavelet transform (DWT), which may not be one-to-one. What is commonly called the discrete wavelet transform is specifically referred to as the one-to-one discrete wavelet transform in the present embodiments.

Finally, the S-transform may have a number of variations. For example, the S-transform may include a continuous time-frequency transform that uses Gaussian windows to provide time localization. Alternatively, the discrete (but not one-to-one) ST (DST), and the "fast" ST, which is a method to calculate the discrete ST from the frequency domain and, though more efficient than the time-domain version, is still quite slow when compared to other time-frequency transforms. As used herein, the DST calculated in the frequency domain is called the frequency-domain ST, or frequency-domain DST.

Additional transforms include a discrete orthonomal S-transform (DOST). The DOST refers to a discrete, though still not one-to-one, transform that uses sinc shaped windows (boxcar functions in the frequency domain). Since Gaussian windows are not supported, the DOST is not really an S-transform.

The GFT of the present embodiments may include a general transform that encompasses the FT, STFT, ST, GST and DOST. The fast GFT algorithm described herein may be a fast, one-to-one, discrete transform. Due to the generality of the GFT, this algorithm may represent an efficient means of calculating the STFT, ST and GST, as well as a faster method of computing the DOST. Besides unifying these transforms in one framework, the fast GFT algorithm greatly improves on the computational efficiency of the ST, GST and DOST. A signal that would take days to transform using the frequency-domain DST algorithm may be transformed using the fast GFT in less than a second.

The present embodiments also describe a general framework for describing linear time-frequency transforms that allows the Fourier, wavelet and S-transforms to be compared directly. The fast discrete S-transform algorithm described herein may greatly diminished computational and storage demands. This transform is much more computationally efficient than original continuous approximations of the ST, and so, allows the ST to be used in acute clinical situations as well as allowing more advanced applications than have been investigated to date, including analyzing longer signals and larger images, as well as transforming data with three or more dimensions, e.g., volumes obtained by magnetic resonance (MR) or computed tomography (CT) imaging.

System Architecture

FIG. 1 illustrates one embodiment of a system 100 configured for signal processing with fast S-transforms. In one embodiment the system 100 includes a signal receiver 102 and a signal processor 104. The system 100 may additionally include a signal transmitter 106. In a further embodiment, the system 100 may include one or more user interface devices.

According to one embodiment, the signal receiver 102 may include an input port and/or coupler (not shown). The input port may receive an incoming signal from, e.g., an antenna, scanner, sensor, or the like. In a further embodiment, the signal receiver may include an analog to digital (A/D) converter configured to sample the incoming signal. The A/D converter may generate a signal dataset comprising values representing sampled signal levels.

In a further embodiment, the signal receiver 102 may be coupled to the signal processor 104. The signal receiver 102 may provide the signal dataset to the signal processor 104. The signal processor 104 may be configured to compute a fast ST of the signal dataset as described below. In one embodiment, the signal processor 104 may calculate the fast ST according to a frequency-domain algorithm. Alternatively, the signal processor may compute the fast ST according to a time-domain algorithm. Both the frequency-domain algorithm and the time-domain algorithm are described in greater detail below.

In a further embodiment, the signal processor 104 may perform one or more operations on a resultant fast ST dataset. The signal processor 104 may then convert the fast ST dataset to a second signal dataset by using an inverse fast ST as described in greater detail below. In one embodiment, the signal processor 104 may provide the second signal dataset to the signal transmitter 106. The signal transmitter 106 may either transmit an analogue or a digital signal corresponding to the second signal dataset. In one embodiment, the signal transmitter 106 may include a digital to analogue (D/A) converter and one or more output ports and/or couplers (not shown).

In a further embodiment, the signal processor 104 may be coupled to a user interface device 108. A user interface device 108 may include, but is not limited to, a display device, a keyboard, a mouse device, or the like. The signal processor 104 may communicate information with the user interface device 108. For example, the signal processor 104 may send information to the user interface device 108 configured to generate a graphical user interface, an image display, or the like. In a further embodiment, the signal processor 104 may be configured to receive one or more user inputs, such as control commands, from the user interface device 108.

Figure 2:
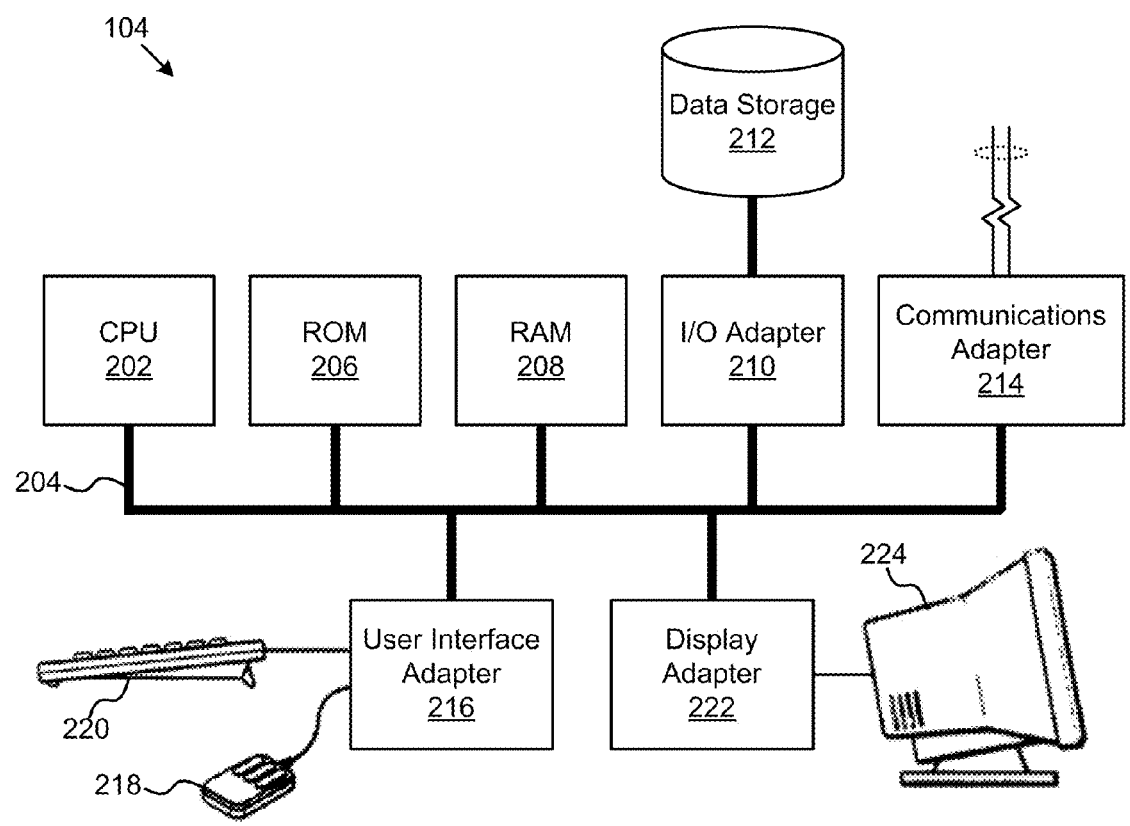
FIG. 2 is a schematic block diagram illustrating one embodiment of a computing device suitably configured for signal processing with fast S-transforms.

FIG. 2 illustrates a computer system 200 adapted according to certain embodiments of the signal processor 104. The central processing unit (CPU) 202 may be coupled to the system bus 204. The CPU 202 may be a general purpose CPU or microprocessor. The present embodiments are not restricted by the architecture of the CPU 202 as long as the CPU 202 supports the modules and operations as described herein. The CPU 202 may execute the various logical instructions according to the present embodiments. For example, the CPU 202 may execute machine-level instructions according to the exemplary operations described below with reference to the frequency-domain fast ST or the time-domain fast ST.

The computer system 200 also may include Random Access Memory (RAM) 208, which may be SRAM, DRAM, SDRAM, or the like. The computer system 200 may utilize RAM 208 to store the various data structures used by a software application configured to perform the fast ST. The computer system 200 may also include Read Only Memory (ROM) 206 which may be PROM, EPROM, EEPROM, or the like. The ROM may store configuration information for booting the computer system 200. The RAM 208 and the ROM 206 hold user and system 100 data.

The computer system 200 may also include an input/output (I/O) adapter 210, a communications adapter 214, a user interface adapter 216, and a display adapter 222. The I/O adapter 210 and/or user the interface adapter 216 may, in certain embodiments, enable a user to interact with the user interface device 108 in order to input information for, e.g., setting parameters of the fast ST.

The I/O adapter 210 may connect to one or more storage devices 212, such as one or more of a hard drive, a Compact Disk (CD) drive, a floppy disk drive, a tape drive, to the computer system 200. The storage device 212 may be a tangible computer readable medium comprising computer readable instructions that, when executed by the CPU 202, cause the computer system 200 to be suitably programmed to perform signal processing with the fast ST according to the present embodiments. The communications adapter 214 may be adapted to couple the computer system 200 to the network 106, which may be one or more of a LAN and/or WAN, and/or the Internet. The user interface adapter 216 couples user input devices, such as a keyboard 220 and a pointing device 218, to the computer system 200. The display adapter 222 may be driven by the CPU 202 to control the display on the display device 224.

The present embodiments are not limited to the architecture of system 200. Rather the computer system 200 is provided as an example of one type of computing device that may be adapted to perform the functions of a signal processor 104. For example, any suitable processor-based device may be utilized including without limitation, including personal data assistants (PDAs), computer game consoles, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

Figure 3:
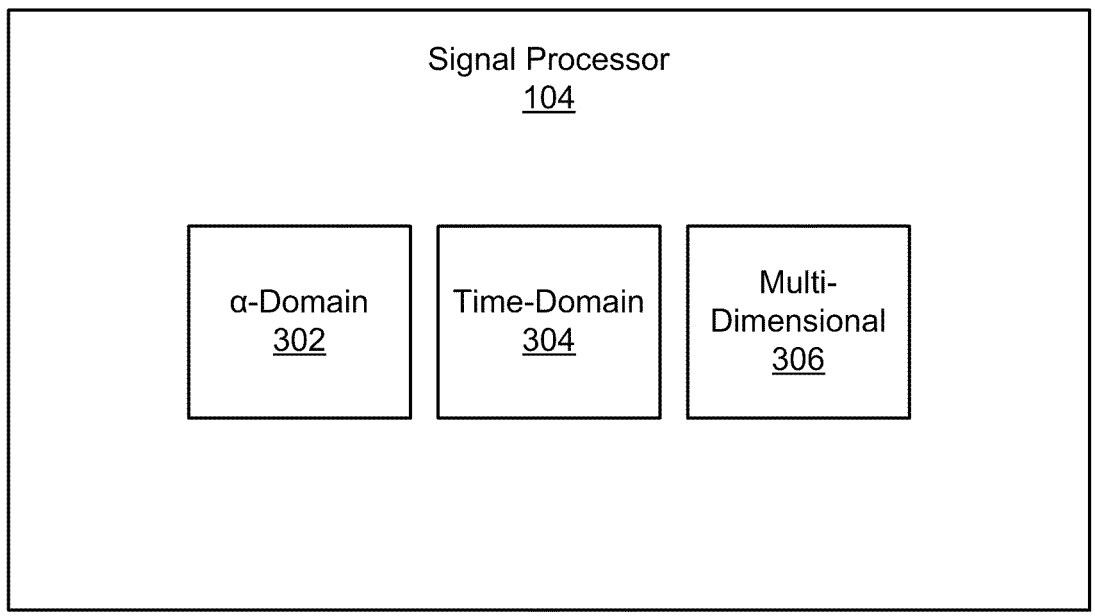
FIG. 3 is a schematic block diagram illustrating another embodiment of a signal processing device configured for signal processing with fast S-transforms.

For example, FIG. 3 is a schematic block diagram illustrating one embodiment of logical modules of a single processor 104. In one embodiment, the signal processor 104 may include Digital Signal Processing (DSP) device that may be configured to perform the fast ST according to the present embodiments. For example, one embodiment of a DSP device that may be used in accordance with the present embodiments is a Super Harvard Architecture Single-Chip Computer (SHARC) type DSP. In one embodiment, the DSP 104 may include an α-domain module 302 for performing the α-domain ST, a time-domain module 304 for performing the time-domain ST, and a multi-dimensional ST module 306 for extending the fast ST to multi-dimensional data. Further embodiments of the function of each module are described below with reference to the α-domain ST, the time-domain ST, and the multi-dimensional ST respectively.

α-Domain S-Transform

The Fourier Family of Transforms

The Fourier transform (FT) describes a signal in terms of a series of complex sinusoids, with varying amplitude and phase. The sinusoidal basis functions of the FT are purely periodic and infinite in extent, and the FT converts entirely between the time and frequency domains, with no direct temporal information remaining after the transform. As noted in the introduction, this process is ideal for stationary signals, where the frequency content does not change over time. However, in many applications, non-stationary signals are common, and frequency changes over time or space are often not only present, but are in fact the very feature the inventors are interested in examining. To allow examination of non-stationary signals, a number of solutions have been proposed, including the STFT and, more recently, the ST.

The ST of a time signal, s(t), may be expressed as:

$$S(\tau, v) = \int_{-\infty}^{+\infty} s(t) \frac{|v|}{\sqrt{2\pi}} e^{-\frac{(\tau-t)^2 v^2}{2}} e^{-i2\pi v t} dt \quad (1)$$

where s(t) is the signal to be transformed and $\tau$ and $v$ are the transform time and frequency coordinates. This equation has the same form as that of the FT, but adds a normalized area Gaussian window for time localization. It is important to note that the window also depends on $v$, causing the width of the window to decrease with increasing frequency. This automatically adjusts the ST window to provide a progressive trade off between time and frequency resolution for each frequency, with finer frequency resolution at low frequencies and better time resolution at high frequencies. Like the FT and STFT, the ST produces a complex spectrum that includes both frequency and globally referenced phase information.

The ST may be similar in form to the Morlet wavelet. By way of comparison, the ST basis functions are not a proper wavelet as they may not satisfy the condition of zero mean for admissible wavelets. Additionally, the basis functions of the ST, and more generally of the GFT, may not be shifted and scaled versions of a mother function, and are not self-similar. Due to this, the GFT may produce a globally referenced phase spectrum where all phase measurements are relative to the origin. Though complex wavelets exist, these typically produce locally referenced phase measurements where the reference point changes as the wavelet is shifted. The globally-referenced phase of the GFT allows the Fourier spectrum to be directly recovered from any GFT, and facilitates the use of phase analysis techniques such as cross-spectral analysis.

In one embodiment, Magnetic Resonance (MR) imaging may directly measure the complex Fourier spectrum of the object being imaged. Many MR techniques, such as phase contrast MR, encode velocity information in the phase. Furthermore, many artifacts in MR imaging, such as those caused by motion and magnetic field non-uniformities, manifest themselves as changes in the phase. Since phase is critically important in this modality, many filtering, reconstruction and analysis techniques are based on the FT. These techniques could potentially be improved by using the ST, since it offers the capability to perform local analysis of non-stationary signals.

In one embodiment, the ST may be generalized to include arbitrary windows as follows:

$$S(\tau, v) = \int_{-\infty}^{+\infty} s(t) \cdot w(\tau - t, v) \cdot e^{-i2\pi v t} dt \quad (2)$$

where $w(\tau-t,v)$ is a general window function that satisfies:

$$\int_{-\infty}^{+\infty} w(\tau - t, v) d\tau = 1 \text{ for all } v. \quad (3)$$

The original ST may be a special case of this general S-transform, where $w(\tau-t,v)$ is a Gaussian function.

The General Fourier Family Transform

The ST may be effectively further generalized into a general Fourier family transform (GFT), which may encompass all Fourier family transforms as follows:

$$S(\tau, v) = \int_{-\infty}^{+\infty} s(t) \cdot w(t - \tau, \sigma) \cdot e^{-i2\pi v t} dt. \quad (4)$$

If $\sigma = v$ (i.e., the windows are adaptive), the GFT is a general ST or, if $\sigma = C$, it is a short time Fourier transform (STFT) with a constant window width C. The Fourier transform itself can be understood in this context by using a constant window, $w(t-\tau,\sigma)=1$.

In the GFT formalism the complex sinusoid, $e^{-i2\pi v t}$, may be labeled as the transform kernel, and $w(t-\tau,\sigma)$ as the transform window. The product of the two forms the transform basis functions. In this context, the FT, STFT, ST and GST are examples of the GFT, differing by properties of their respective windows.

Discrete Fourier Family Transforms

Calculation of the discrete ST, or of the discrete GST, presents a considerable computational challenge. Calculated from the time domain according to Eq. (1), the DST of an N-point signal generates an N×N-point spectrum. Each of those $N^2$ points requires a numerical approximation of the integral in Eq. (1), which is a summation over the N-point signal multiplied by the basis function. Therefore, the total computational complexity of this operation is $O(N^3)$ and the resulting spectrum requires $O(N^2)$ storage space. Alternatively, the DST may be calculated somewhat more efficiently by operating on the Fourier spectrum and taking advantage of the FFT algorithm. This alternative requires $O(N^2 \log N)$ operations and has the same memory requirements, $O(N^2)$. In comparison, the DFT (and some discrete wavelet transforms) can be calculated in place, with the transform requiring no more space than the original signal. The one-dimensional one-to-one DFT has a computational complexity of $O(N^2)$. The FFT improves on this, with a computational complexity of $O(N \log N)$.

Due to the high computational complexity of the ST, transforms of longer signals and even small images has proven to be challenging to compute and store. As an example, the DST of a 512×512 pixel image, which is a typical image size encountered in medical imaging applications, may currently take more than a day to compute and require around 1 TB of storage (double precision complex floating point), compared to the FFT, which currently takes milliseconds and requires 4 MB of storage.

Though parallel and distributed computing techniques for calculating the ST on multiprocessor machines and computing clusters have been developed, computation of the DST for large signals or images is prohibitive, severely limiting potential applications of the ST. A more efficient fast DST algorithm may both allow (i) implementation of ST-based techniques that have shown promise, and (ii) application of the ST in many other areas that benefit from signal processing.

Characterization of the Generalized Fourier Family Transform

Since any operation on a signal implies a concomitant operation on the frequency spectrum of the signal, it is often useful to consider such modifications simultaneously from both perspectives. For example, the convolution of two signals is equivalent to multiplication of the Fourier transforms of those signals: convolution in the "time domain" is equivalent to multiplication in the "frequency domain." In one embodiment, it may be possible to make use of two more domains: the "(generalized) S-domain," $S(\tau,v)$, defined by Eq. (4), and the "$\alpha$-domain," defined as:

$$\alpha(v', v) = \int_{-\infty}^{+\infty} S(\tau, v) \cdot e^{-i2\pi v' \tau} d\tau \quad (5)$$

where the v'-axis is produced by taking the Fourier transform along the $\tau$-axis of the S-domain.

The $\alpha$-domain is also related to the frequency domain by:

$$\alpha(v',v) = F(v'+v) \cdot W(v',\sigma) \quad (6)$$

as shown in the Appendix, where F(v') and W(v',σ) are the FTs of the signal and the window function along the τ-axis, respectively. The S-domain is recoverable from the α-domain via:

$$S(\tau, v) = \int_{-\infty}^{+\infty} \alpha(v', v) \cdot e^{i2\pi v'\tau} dv' \quad (7)$$

Figure 4:
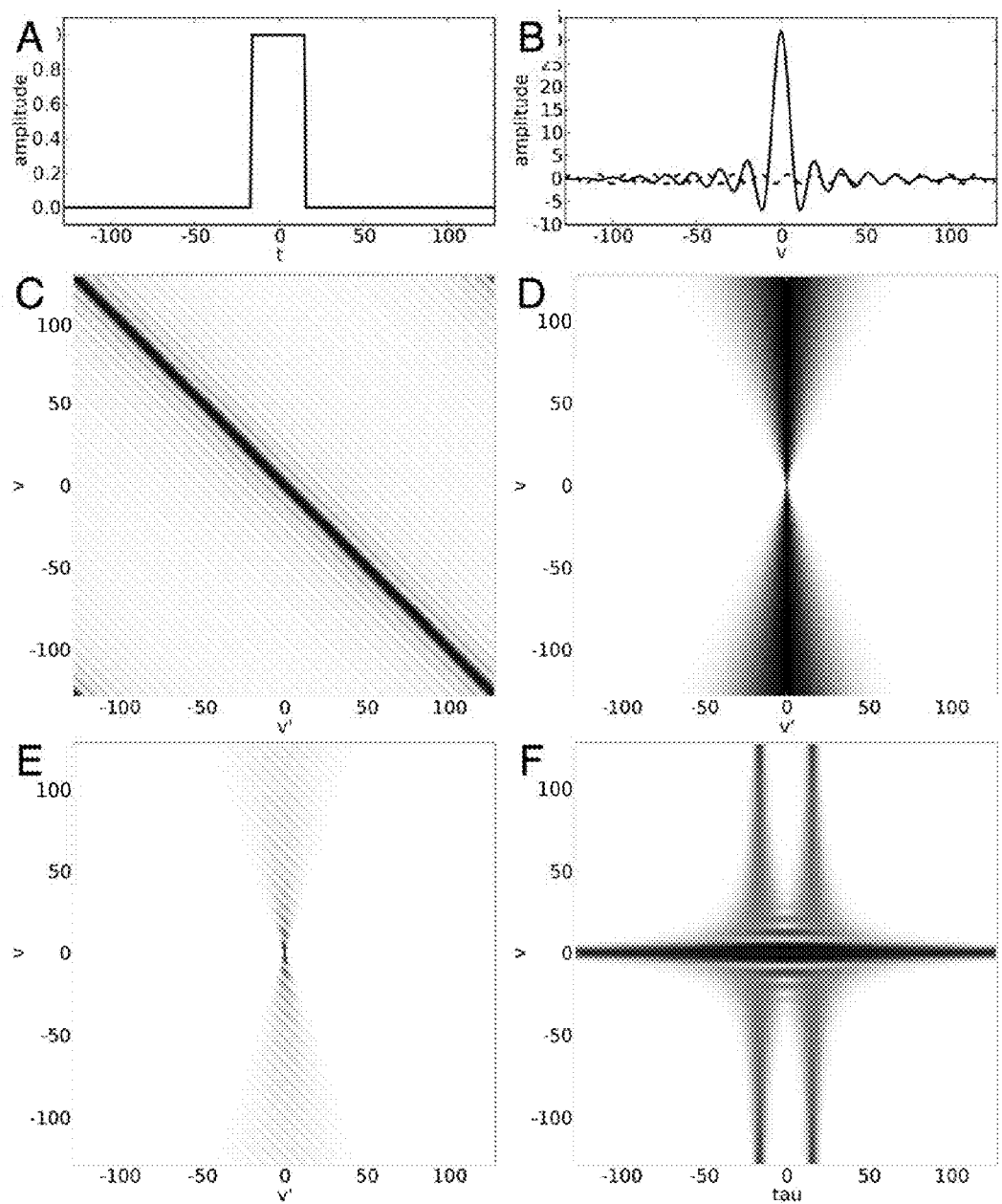
FIGS. 4A-F show an example of the construction of the α-domain for a simple signal, and the associated S-domain.

In one embodiment, a frequency domain DST algorithm may be calculated via the α-domain: the Fourier transform of the signal may be shifted and multiplied by the Fourier transform of the window, then inverse Fourier transformed to build up the S-domain. FIG. 4 shows an example of the construction of the α-domain for a simple signal, and the associated S-domain. In the described embodiment, the signal is a simple boxcar signal as shown in FIG. 4A that has a Fourier transform which is a sinc depicted in FIG. 4B. As defined in Eq. (6), the α-domain may include shifted copies of the FT shown in FIG. 4C multiplied by the FT of the window functions illustrated in FIG. 4D. The product shown in FIG. 4E can be Fourier transformed along the v'-axis to produce the S-domain as shown in FIG. 4F. This example uses Gaussian windows that scale with frequency, and so the result in FIG. 4F is a discrete S-transform.

Since the DST produces an N×N result from an N-point signal, it may contain redundant information. In the S-domain that redundancy is illuminated by the Heisenberg uncertainty principle: the more finely energy is localized in the time domain, the more uncertain is its location in the frequency domain, and vice versa. This basic property is not reflected by the N×N S-domain sampling scheme since it produces uniform time (τ) and frequency (ν) resolution at all points. However, it is not entirely clear how to perform efficient sampling in the S-domain, particularly for arbitrary windows. Though the DOST attempts this using a dyadic sampling scheme, it still produces an S-domain with more than N points. Furthermore, the DOST is restricted to windows that are a boxcar function in the frequency domain, or equivalently, a sinc function in the time domain, which has several undesirable properties.

The redundancy of the N×N S-domain is more clearly revealed in the corresponding N×N α-domain (FIG. 4). Since each horizontal line (along v') at a particular ν value is a shifted version of the FT of the signal multiplied by W(v',σ), the full frequency domain, and thus the signal, is recoverable from any one of these horizontal lines, provided W(v',σ) does not have any zero values. Similarly, each vertical line at a particular v'-value is also a shifted version of F(ν) windowed by the known W(v',σ). In one embodiment, the full Fourier spectrum may be obtained from any τ-line of the S-domain by Fourier transforming the line, dividing by W(v',σ), and shifting accordingly. Additionally, by the Fourier Projection Slice Theorem, a projection through the S-domain along the τ-direction produces the v'=0 line of the α-domain, which is also a complete Fourier spectrum.

The Fast General Fourier Family Transform

The α-domain representation and the Heisenberg uncertainty principle clearly suggest two optimizations that can be made to the N×N sampling scheme: (i) band pass filtering along v' and (ii) octave sampling along ν. The α-domain is weighted by the Fourier transform of the window functions. The purpose of the window is to provide localization in the time domain, but via the uncertainty principle it also controls the degree of localization in the frequency domain. To provide localization in the frequency domain, the window may act as a band-pass filter, i.e., frequencies at a distance from the window centre will be attenuated. This is illustrated in FIG. 4D for the Gaussian windows of the ST. A degree of optimization can be achieved by discarding the portions of each v'-line that are not band-passed by the window. In transforms where σ (the width of the window) varies, the extent of the remaining v'-segment will vary to match the band-pass characteristics of the window (FIG. 5B).

Figure 5:
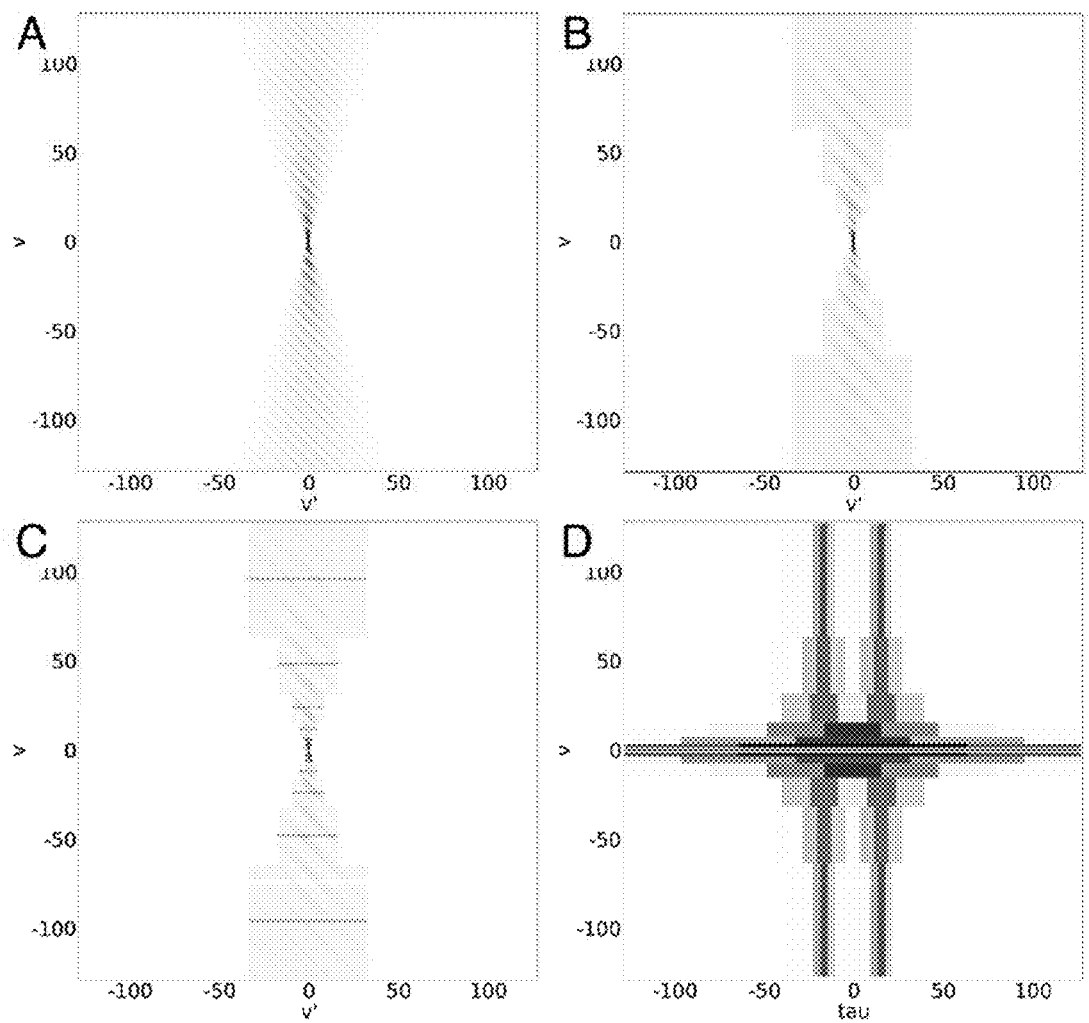
FIGS. 5A-D illustrate one embodiment of a band-passed region of the signal shown in FIG. 4A.

Further optimization is obtained by sampling along the ν-axis in an octave fashion (FIG. 5C). Taken together, these two optimizations produce a dyadic sampling scheme (FIG. 5C). The result can be Fourier transformed to produce an N-point S-domain (FIG. 5D).

Figure 6:
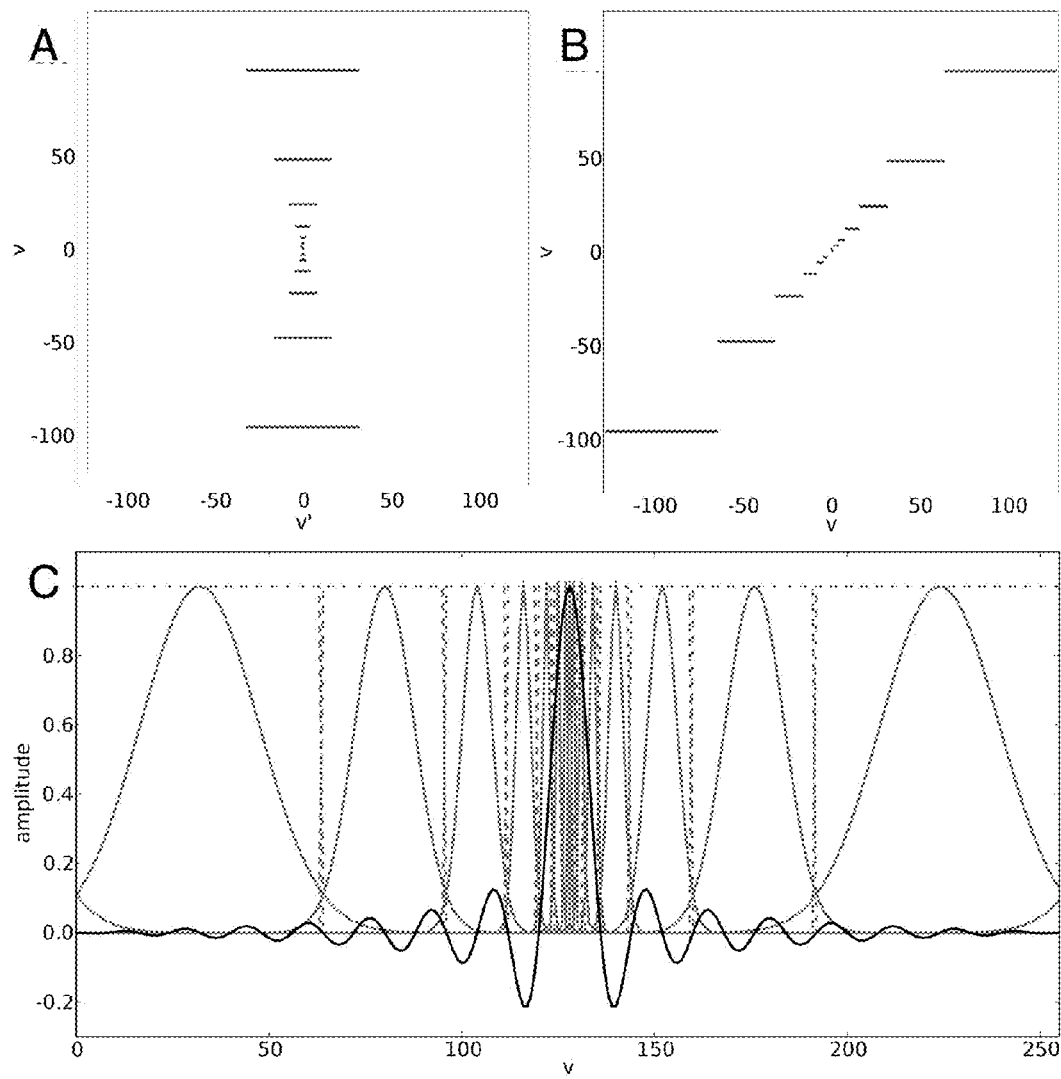
FIGS. 6A-C illustrate one embodiment sampled and shifted signals in the α-domain.

By reversing the shift applied to the frequency domain as part of the construction of the α-domain, the relationship of this sampling scheme to the Fourier transform of the signal may become clear (FIG. 6). The frequency domain may be partitioned and windowed (FIG. 6C), then inverse Fourier transformed in parts to produce the S-domain. This calculation is described in the pseudo code for Algorithm 1, which is a fast GFT, synthesizing the S-domain from the frequency domain.

Algorithm 1

The in-place fast general Fourier family transform is described below. By way of illustration, A[*] is an array of N points. The subscript on A may indicate its domain: t is the time domain, ν is the frequency domain and τ represents the S-domain samples along the τ-axis. In this example a dyadic frequency sampling scheme may be used, but this could be adapted, for example in the STFT.

---

LET $A_t[0:N]$ be an array of N samples representing a signal
1. Calculate the FFT of the signal: $A_v[0:N] = FFT_{t \to v}(A_t[0:N])$ FOR $f_{start}$ in $\left[0, 1, 2, 4, \ldots, \frac{N}{8}, \frac{N}{4}\right]$ DO:

IF $f_{start} < 2$:
  LET $f_{width} = 1$, $f_{centre} = f_{start} + 1$
 ELSE:

LET $f_{width} = f_{start}$, $f_{centre} = f_{start} + \frac{f_{width}}{2} + 1$

LET $f_{end} = f_{start} + f_{width}$
  LET $f_{start}' = -f_{start}$, $f_{end}' = -f_{end}$ and $f_{centre}' = -f_{centre}$
 2. Calculate the window function and FFT:
  $W[0:N] = FFT_{t \to v}(w[0:N])$
 3. Shift the window function to be centered on the frequency band:
  $W[0:N] = shift(W[0:N], f_{centre})$
 4. Apply the window to the frequency band:
  $A_v[f_{start}:f_{end}] = A_v[f_{start}:f_{end}] \cdot W[f_{start}:f_{end}]$
 5. Calculate the in-place inverse FFT of the frequency band:
  $A_\tau[f_{start}:f_{end}] = FFT^{-1}_{v \to \tau}(A_v[f_{start}:f_{end}])$
  Note: The result of this step, $A_\tau[f_{start}:f_{end}]$, maps to $S[0:\tau_{max}, v_{centre}]$ in the S-domain.
 6. Repeat steps 3 to 5 substituting $f_{start}'$, $f_{end}'$ and $f_{centre}'$ to calculate the negative frequencies.
END FOR

---

Computational Complexity of Algorithm 1

For a signal of N points, Algorithm 1 consists of an N point FFT (step 1), a shift (step 3), an M point multiply (step 4) and an M point inverse FFT (step 5). Steps 3 through 5 are performed twice, once for the positive frequencies and once for the negative frequencies (step 6). Although Algorithm 1 shows the window functions calculated inside the loop (step 2) for brevity, they may be pre-calculated.

Of the steps in the loop, the one with the highest order is step 5, an FFT of M points, which can be accomplished in O(M log M). For a dyadic sampling scheme, as in Algorithm 1, M takes values in $$\left[0, 1, 2, 4, \ldots, \frac{N}{8}, \frac{N}{4}\right],$$

but all one-to-one GFT sampling schemes have $$\sum_{i=1}^{K} M_i = N.$$

If the inventors let $M_i = f_i N$, where $f_i$ is the fraction of points, i.e. $f_i \in (0,1)$, then $$\sum_{i=1}^{K} M_i = N \Rightarrow \sum_{i=1}^{K} f_i N = N \sum_{i=1}^{K} f_i = N, \therefore \sum_{i=1}^{K} f_i = 1.$$

Using this relation the inventors can write the order of step 5 as $$\sum_{i=1}^{K} M_i \log(M_i).$$

Substituting $M_i = f_i N$ the inventors have:

$$\sum_{i=1}^{K} f_i N \log(f_i N) = N \sum_{i=1}^{K} f_i [\log(f_i) + \log(N)]$$

$$= N \log(N) \sum_{i=1}^{K} f_i + N \sum_{i=1}^{K} f_i \log(f_i).$$

From above, $$\sum_{i=1}^{K} f_i = 1,$$

so this simplifies to $$N \log(N) + N \sum_{i=1}^{K} f_i \log(f_i).$$

Since $$f_i \in (0, 1), \sum_{i=1}^{K} f_i \log(f_i) \leq 0.$$

In fact, it is zero only if K=1, which implies $f_i=1$, the trivial case corresponding to the FFT. For K>1 the inventors have $$\sum_{i=1}^{K} f_i \log(f_i) < 0, \text{ so } \sum_{i=1}^{K} M_i \log(M_i) < N \log(N).$$

Since the complexity of step 5 is less than N log N, the complexity of the loop is dominated by the N point FFT in step 1, which gives the order of the algorithm: O(N log N).

As shown above, Algorithm 1 has a computational complexity of O(N log N) and transforms an N-point signal into an N-point S-domain. This performance is a great improvement over (i) the time domain DST, which is $O(N^3)$ and produces an $N^2$-point S-domain, (ii) the frequency domain DST, which is $O(N^2 \log N)$ and also produces an $N^2$-point S-domain, and (iii) the DOST, which is $O(N^2)$ and produces a C·N-point S-domain, where $1 < C \leq N$. The computational complexity fast GFT is of the same order as the Fast Fourier Transform, which is also O(N log N) and produces an N-point result. Since the GFT formalism describes the STFT, GST and DOST, the fast GFT algorithm provides a computationally and memory efficient method for calculating all three transforms.

The fast GFT algorithm presented here is the minimally sampled, one-to-one transform. This configuration is efficient to compute and store, but some applications may benefit from a less optimal implementation. If the frequency domain windows are allowed to overlap, introducing some redundancy, a smoother window shape may be achieved. This redundancy comes at the cost of some computation time and additional storage requirements. For example, if each window is allowed to overlap its neighbors by 50%, each FFT in Algorithm 1 (step 5) will require transforming twice as many points, increasing the computation time and producing an S-domain with 2N points. However, for constant overlap factors, such as in this example, the computational complexity of the algorithm will remain at O(N log N).

Figure 7:
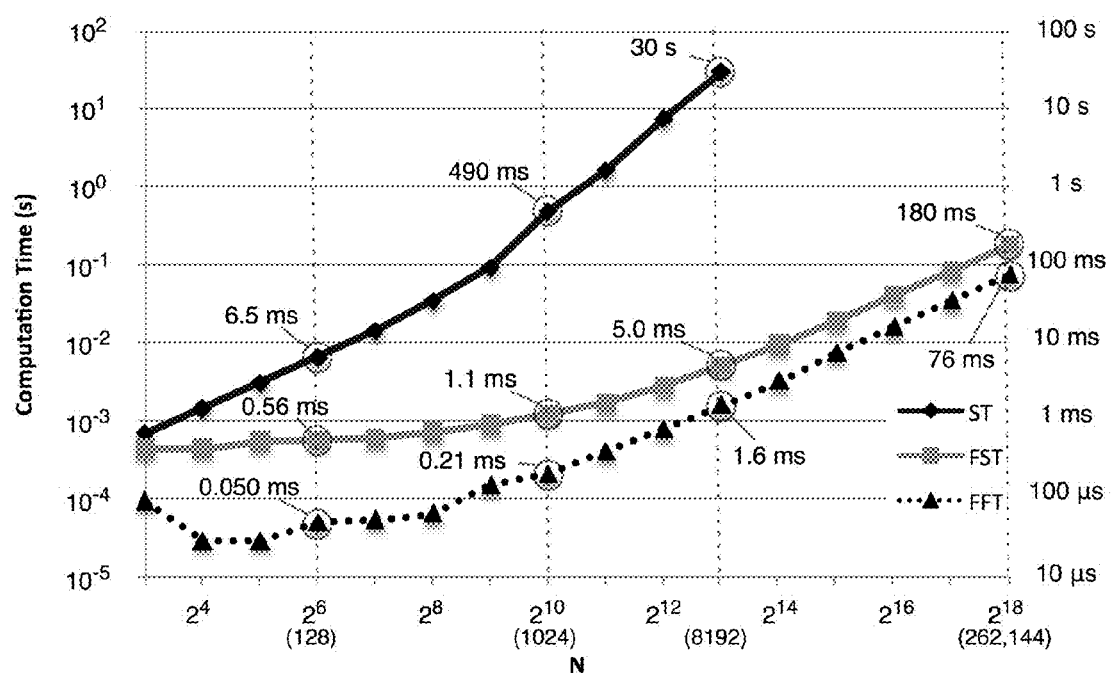
FIG. 7 illustrates one embodiment of benchmarks comparing the computation speed of the FFT (dotted black line), DST (solid black line) and fast GFT (gray line) for one-dimensional signals of various lengths.

Actual computation times for the frequency domain DST, the fast GFT (Algorithm 1), and an optimized FFT library are compared in FIG. 7. Due to memory constraints, the largest signal that could be calculated with the DST algorithm had $N=2^{13}$ points. While the DST of this signal took over 30 s, the fast GFT and the FFT each took only a few milliseconds: 5 ms and 2 ms, respectively.

Figure 8:
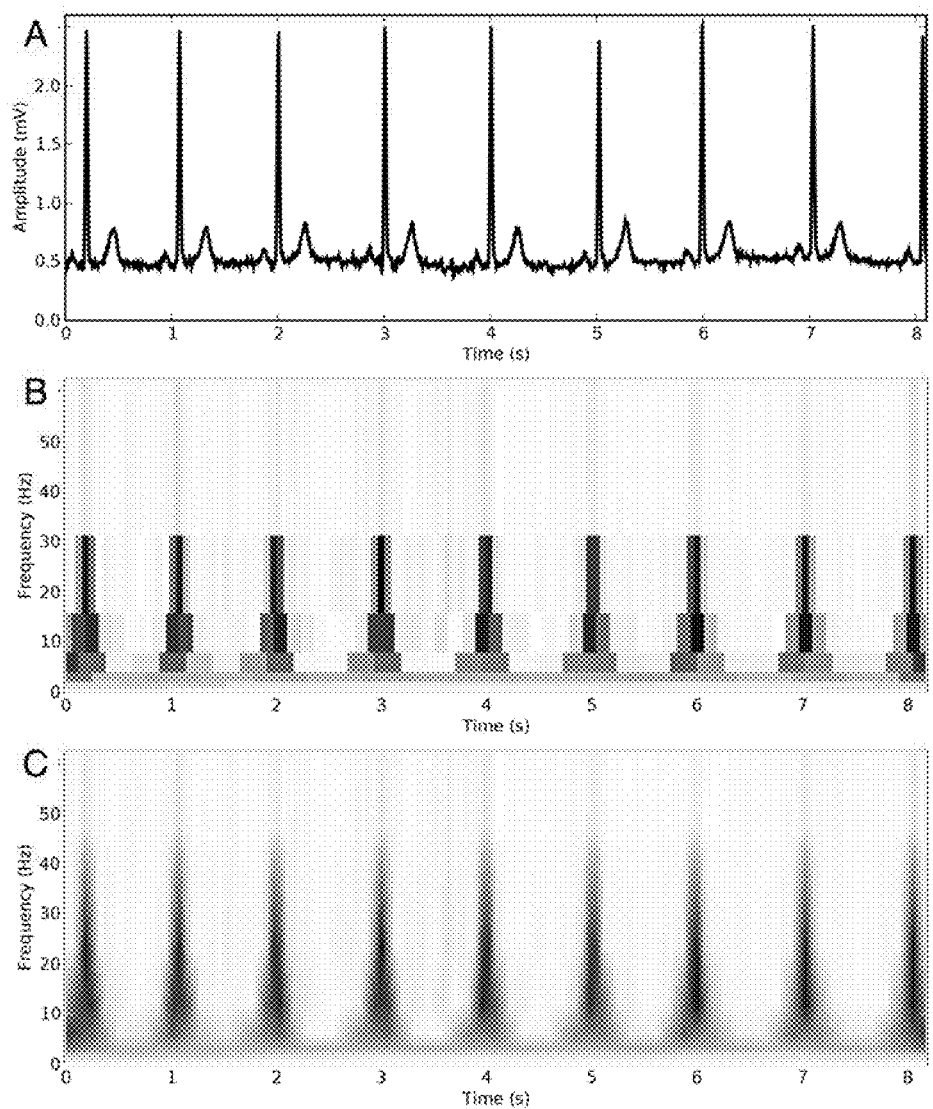
FIGS. 8A-C illustrate one embodiment of an application of the fast S-transform to an ECG signal.

The efficiency of the fast GFT allows computation of the transform for larger signals and images. For example, FIG. 8A shows the first 8 s of one embodiment of an electrocardiogram (ECG) recording. In this case, ST-T refers to ST- and T-waves, which are features of an ECG and are not related to the S-transform. This sample is from the V4 lead of record e0103, a 62-year-old male subject complaining of mixed angina. The complete recording contains over one million points. FIG. 8B is a portion of the spectrum produced by a transform of the first $2^{20}$ points from this signal, using the fast GFT with adaptive Gaussian windows. In this configuration the GFT is a fast ST. The transform took 0.77 s to calculate. The classic frequency domain S-transform algorithm, if it could be calculated entirely in memory, would take over three days. However, since the N×N spectrum requires 16 TB of storage space (64-bit complex data), swapping to an array of hard drives would greatly increase the computation time beyond even this figure. FIG. 8C is the same spectrum with bilinear interpolation.

The Inverse Fast General S-Transform

The forward continuous GFT is calculated via the α-domain by shifting and windowing the Fourier transform of the signal, according to Eq. (6), then inverse Fourier transforming each horizontal v'-line to produce the S-domain, according to Eq. (7). The inverse continuous GFT reverses these steps, using the FT of each horizontal τ-line in the S-domain to recover the α-domain, according to Eq. (5). As discussed in Section above, the signal can then be obtained from any horizontal line in the α-domain by dividing by W(v',σ), shifting, and taking the inverse FT. Alternately, the complete frequency domain can be reconstructed directly from the S-domain by summing over τ.

The fast GFT avoids redundancy by using only the central band-passed portion of the α-domain along the v'-axis and sampling on a dyadic scale along the v-axis. This scheme samples along horizontal line segments in the α-domain (FIG. 5C). The inverse FFT of each line segment produces a horizontal line of the S-domain (FIG. 5D). Since the α-domain is sampled using a total of N-points, the corresponding S-domain will also be sampled with a total of N-points.

Since the S-domain is sampled using only N points, the inverse fast GFT may require all N points to reconstruct the signal. The FFT of each horizontal line of the S-domain may recover a line segment in the α-domain. When each segment is divided by $W(v',\sigma)$ it may represent an unweighted portion of the frequency domain. As illustrated in FIG. 6, when shifted by v, these segments combine to produce a full frequency domain, which can be inverse fast Fourier transformed to recover the signal. Algorithm 2 calculates this inverse fast GFT in-place, making it optimally memory efficient.

The following pseudo code describes one embodiment of a process for computing the inverse in-place fast general Fourier family transform, using a dyadic sampling scheme for this example:
Algorithm 2

---

LET $A_\tau[0:N]$ be an array of N samples of the S-domain as produced by

FOR $f_{start}$ in $\left[0, 1, 2, 4, \ldots, \frac{N}{8}, \frac{N}{4}\right]$ DO:

IF $f_{start} < 2$:
        LET $f_{width} = 1$, $f_{centre} = f_{start} + 1$
    ELSE:

LET $f_{width} = f_{start}$, $f_{centre} = f_{start} + \frac{f_{width}}{2} + 1$

LET $f_{end} = f_{start} + f_{width}$
        LET $f_{start}' = -f_{start}, f_{end}' = -f_{end}$ and
$f_{centre}' = -f_{centre}$
    1. Calculate the window function and FFT:
        $W[0:N] = FFT_{t \to v}(w[0:N])$
    2. Calculate the in-place FFT of the S-domain band:
        $A_v[f_{start}:f_{end}] = FFT_{\tau \to v}(A_\tau[f_{start}:f_{end}])$
    3. Shift the window function to be centered on the frequency band:
        $W[0:N] = \text{shift}(W[0:N], f_{centre})$
    4. Remove the window:

$$A_v[f_{start}:f_{end}] = \frac{A_v[f_{start}:f_{end}]}{W[f_{start}:f_{end}]}$$

5. Repeat steps 2 to 4 substituting $f_{start}'$, $f_{end}'$ and $f_{centre}'$ to calculate the negative frequencies.
END FOR
6. Recover the signal through the inverse FFT:
$A_t[0:N] = FFT^{-1}_{v \to t}(A_v[0:N])$

---

Time-Domain S-Transform
General Transform

Though the different transforms, particularly the Fourier and wavelet transforms, are often considered to be distinct entities, they have many similarities. To aid comparison of the ST with other transforms and help translate techniques developed for one transform to be used with another, the inventors present several common transforms in a unified context. Previous investigators have noted the similarities between the FT, STFT and wavelet transform and the utility of representing them in a common context. To this end, generalized transforms that describe all three have been constructed. However, to our knowledge, previous generalized formalisms do not explicitly specify separate kernel and window functions. Separating the two may better illustrate the relationships between the transforms, particularly when the ST is included. Eq. 2 describes a generalized integral transform of a signal, s(t), multiplied by a kernel function, $\phi(t,\tau,v)$, and a window, $w(t,\tau,v)$.

$$T(\tau, v) = \int_{-\infty}^{+\infty} s(t)w(t, \tau, v)\phi(t, \tau, v)dt \qquad (9)$$

The result is a spectrum, $T(\tau,v)$, which has both time, τ, and frequency (or analogue), v, axes. The kernel determines the target domain of the transform and provides localization in that domain (the v axis). The window provides localization in the original domain (the τ axis). The variable τ determines the centre of the window and is equivalent to the shift parameter of the wavelet transform.

In many common cases w and φ are symmetric, so the correlation in Eq. (9) is also a convolution, making this product, w·φ, the impulse response function or kernel of the system. To remain as consistent as possible with the literature, the inventors will use the term kernel to refer to φ alone, while the product of w and φ will be referred to as a basis function.

Six transforms are presented for comparison in Table 1 using the general transform formalism of Eq. (9). These can be (and usually are) divided into two families by considering whether the basis functions are shifted and scaled versions of each other or not. The Fourier family, including the FT, STFT, ST and sinc transforms (which is discussed later), use the familiar complex sinusoidal kernel $e^{-i2\pi vt}$, which does not depend on τ, and produce a globally referenced phase spectrum. The wavelets, including the Morlet and Haar wavelets, use kernels that are shifted and scaled versions of a mother wavelet. In the general transform formalism this shifting is characterized as a dependence of the kernel on τ, and accounts for the locally referenced phase spectrum of complex wavelets like the Morlet.

In the context of the general transform, the four common members of the Fourier family considered here differ only in their window functions. The Fourier transform is the simplest and uses a constant for the window. This provides no time localization and maximal frequency resolution (the Fourier transform of a constant is a delta-function), transforming all the way from the time to the frequency domain. The Fourier kernel is not shifted across the signal (it does not depend on τ), ensuring that all phase measurements are globally referenced. Since neither the kernel nor the window depend on τ, the variable τ can be eliminated from the equation, leaving the familiar definition of the Fourier transform. The STFT can be understood as a transform using a Fourier kernel and a window, often a boxcar or a Gaussian, that does not depend on v, i.e. the window is not frequency adapted. The window provides a constant time (and thus frequency) resolution.

In terms of the general transform, the S-transform is very similar to the STFT. It also uses the Fourier kernel and a Gaussian window, with one important difference: in this case the window function does depend on v and so the window is adapted depending on the frequency under examination, providing coarse frequency (and finer time) resolution at higher frequencies, much as the wavelet transform does.

The wavelet transform family does not use the Fourier kernel, but rather shifted and scaled versions of a mother wavelet. Two common transforms are the Morlet and Haar wavelets (Table 1). The Morlet mother wavelet consists of a complex sinusoid multiplied by a Gaussian, for time localization. This mother wavelet is then scaled and shifted across the signal during calculation of the transform. In the context of the general transform, the inventors can split this mother wavelet into a complex sinusoidal kernel and a Gaussian window multiplied by a boxcar to make it finite, both of which are similar (though not identical) to those of the S-transform. In one embodiment, the ST may be derived as a phase correction to the Morlet wavelet. Substitution of these functions into the general transform produces an equation that is equivalent to the definition of the Morlet wavelet transform, differing only in the convention of having the kernel function depend on $\nu$ and $\tau$ directly, instead of defining a mother wavelet and subsequently shifting and scaling it.

Finally, the Haar wavelet utilizes a kernel that appears to depart entirely from the Fourier kernel. The Haar mother wavelet, even when divided into window and kernel functions, is non-periodic and discontinuous, unlike the other transforms considered previously. For consistency with the other transforms, this difference can be accommodated by convolving the defined Haar mother wavelet with a comb function (making it periodic) then using a boxcar function as the window to zero all but the desired period.

The Fast S-Transform

Though calculating a discrete approximation of a continuous transform is useful, as with the continuous wavelet and S-transforms, a fully discrete approach makes optimal use of knowledge of the sampling process applied to the signal to decrease the computational and memory resources required. In this section a discrete fast S-transform (FST) is developed by utilizing properties that apply to all of the discrete versions of transforms described by the general transform of Eq. (9).

A sampled signal has two important features—the sampling period, $\Delta t$, and the number of samples, N. Multiplying these two values gives the total signal length, $W_t$. Sampling the signal and limiting it to finite length imposes several limitations on the transformed spectrum. The Fourier transform is the simplest case. The discrete Fourier transform (DFT) of a signal is limited to the same number of samples, N, as the original signal, conserving the information content of the signal. The highest frequency that can be represented, $\nu_{max}$, is the Nyquist frequency, which is half the signal sampling frequency, $$\frac{1}{2\Delta t}.$$

The sampling period of the frequency spectrum, $\Delta\nu$, is the reciprocal of the signal length, $1/W_t$.

The result of the continuous S-transform of a one-dimensional signal is $S(\tau,\nu)$, a spectrum with both time and frequency axes. A fast ST may sample the $\tau$-$\nu$ plane sufficiently such that the transform can be inverted (i.e., without loss of information) but also avoid unnecessary oversampling. If the original signal contains N points, the inventors possess N independent pieces of information. Since information cannot be created by a transform (and may be conserved by an invertible transform) an efficient ST will produce an N point spectrum, as does the DFT. The original definition of the ST produces a spectrum with $N^2$ points. Therefore, for all discrete signals where N>1, the continuous ST is oversampled by a factor of N.

In addition, the ST varies temporal and frequency resolution with changing frequency: higher frequency/lower time resolution at low frequencies and the converse at higher frequencies, but this is not reflected in the uniform $N^2$-point $\tau$-$\nu$ plane sampling scheme. According to the uncertainty principle, at higher frequencies the FST should produce $\tau$-$\nu$ samples that have a greater extent along the frequency axis and lesser extent along the time axis, as is seen in the discrete wavelet transform. The cost of this oversampling is evident in the increased computational complexity and memory requirements of the ST.

Figure 9:
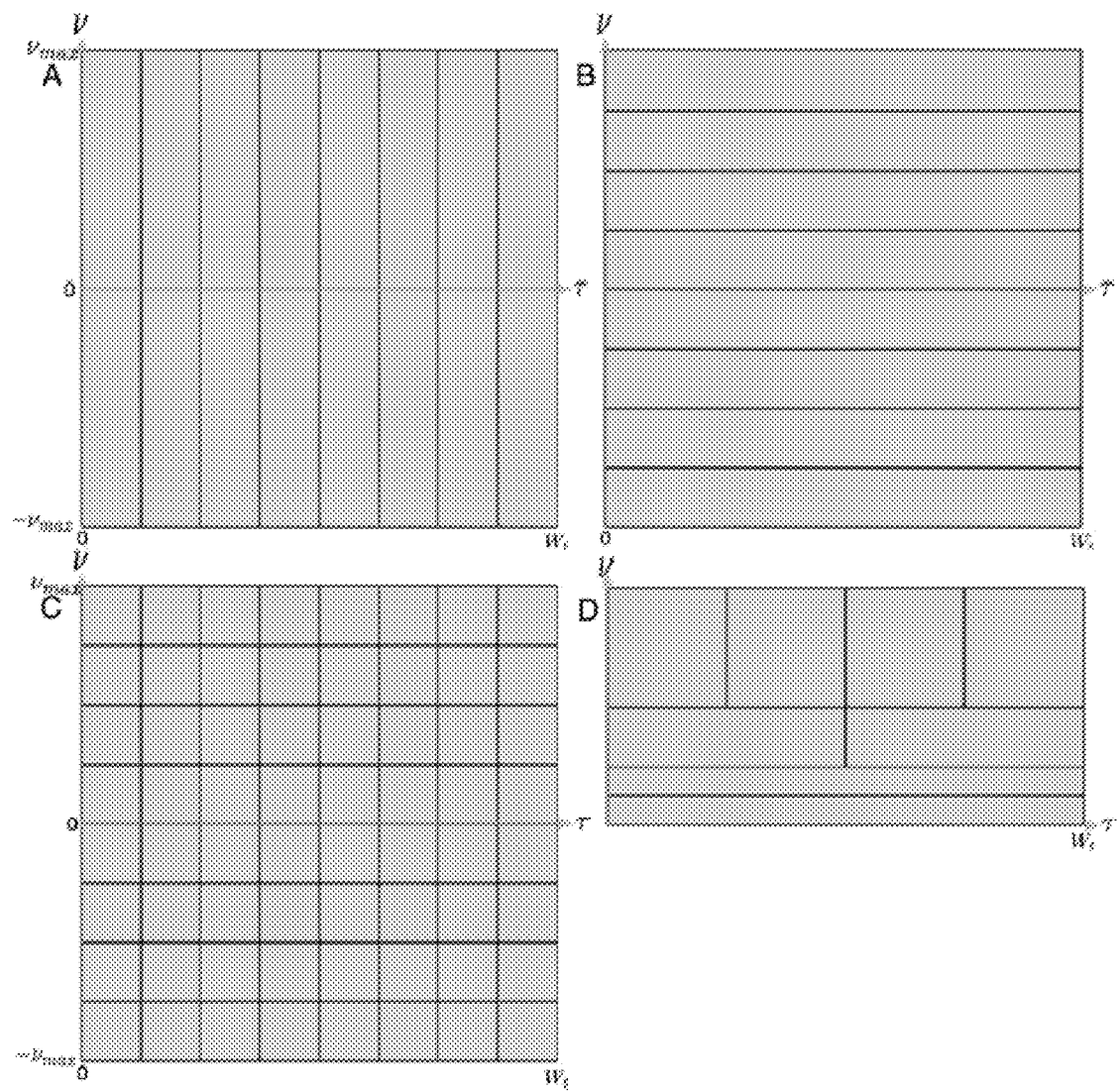
FIGS. 9A-D illustrate one embodiment of a ν-τ sampling scheme in accordance with the present embodiments.
Figure 10:
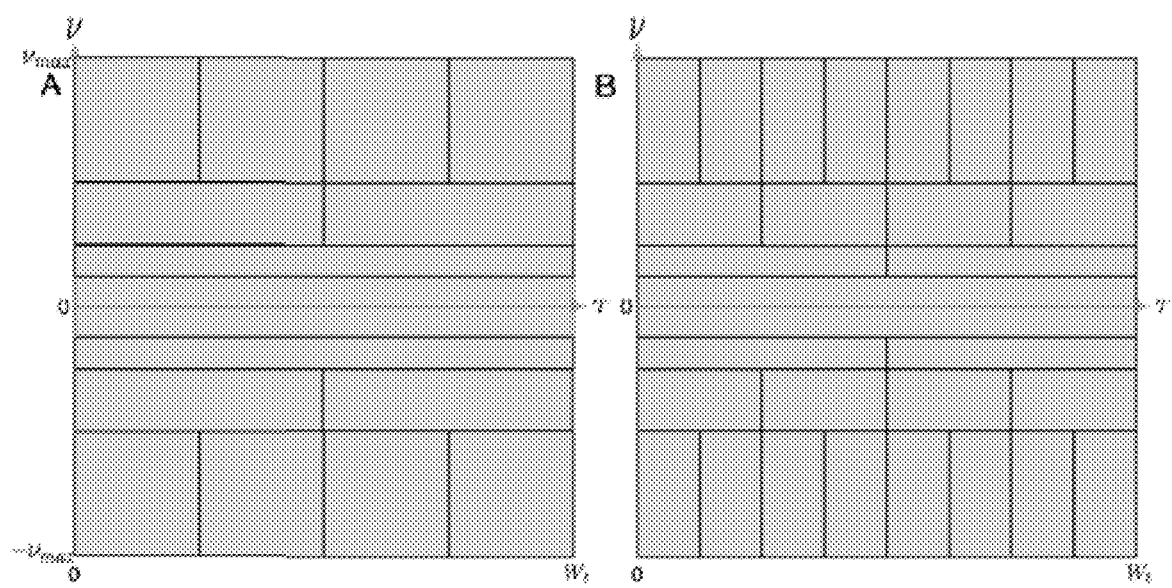
FIGS. 10A-B illustrate embodiments of sampling schemes for the discrete S-transform of a complex 8 sample signal.

The dyadic sampling scheme used by discrete wavelet transforms provides a progressive sampling scheme that matches underlying resolution changes. In light of the similarities between the WT and ST illustrated by the general transform formalism, a dyadic sampling scheme can be used to construct a discrete ST. In the case of the ST of a complex signal, a double dyadic scheme may be used to cover both the positive and negative frequency spectra. In this arrangement, time resolution is at a minimum for low frequencies, both positive and negative, and increases with the absolute value of frequency. For comparison, the $\tau$-$\nu$ plane sampling schemes for the signal, Fourier transform, continuous S-transform and discrete wavelet transform are shown in FIG. 9. In FIG. 9A is a uniformly sampled signal with N=8, FIG. 9B is the Fourier transform, FIG. 9C is the S-transform, and FIG. 9D is a discrete Wavelet transform. FIG. 9A provides no frequency localization, FIG. 9B provides no time localization and both FIG. 9C and FIG. 9D provide time and frequency information simultaneously. While FIGS. 9A, B, and D each have N samples, FIG. 9C has $N^2$. In FIG. 9D, because $\nu$ corresponds to wavelet scale and not frequency, it is positive. The double dyadic scheme of the FST is illustrated in FIG. 10, and a particular algorithm for calculating the FST with this type of sampling scheme is presented in the pseudo code for computational Algorithm 3 described below. No N-sample octave arrangement with integral sample locations exists for the complex FST of a power of two signal.

Algorithm 3: The Discrete S-Transform with 4× Oversampling

---

1. Calculate the Fourier transform of the signal, $H\left(\frac{n}{NT}\right)$

2. Pre-calculate the required kernel functions:

$$\phi^+ = \left(kT, \frac{n}{NT}\right) = e^{-\frac{i2\pi kn}{N}} \text{ and } \phi^- = \left(kT, \frac{n}{NT}\right) = e^{\frac{i2\pi kn}{N}}$$

3. Pre-calculate the window functions $w\left(kT, \frac{n}{NT}\right)$

FOR n in $\left\{\frac{N}{2}, \frac{N}{4}, \frac{N}{8}, \ldots, 4, 2, 1\right\}$ DO:

4. Band pass filter $H(\kappa)$:

$$H'(\kappa) = H(\kappa) \text{ where} \frac{n}{2} < |\kappa| \leq n$$

and inverse FT to obtain h'(t).
FOR every point j in h'(t) DO:
5. Calculate the transform samples:

$$S\left(jT, \frac{3n}{4NT}\right) = \sum_{k=0}^{N-1} h'(kT) \cdot w\left(kT - T, \left|\frac{3n}{4NT}\right|\right) \cdot \phi^+\left(kT, \frac{3n}{4NT}\right)$$

$$S\left(jT, -\frac{3n}{4NT}\right) = \sum_{k=0}^{N-1} h'(kT) \cdot w\left(kT - T, \left|\frac{3n}{4NT}\right|\right) \cdot \phi^-\left(kT, \frac{3n}{4NT}\right)$$

END FOR
END FOR

---

The sampling in FIG. 10A is very similar to the discrete wavelet sampling scheme but adds negative frequencies, resulting in oversampling by a factor of approximately 2.

However, samples are distributed consistently. FIG. 10B depicts an additional 2× oversampling of the τ-axis. This allows the representation of odd to even point transitions in the signal in the appropriate frequency band, and also allows the use of windows that are not perfect Gaussians. Since the oversampling in both FIG. 10A and FIG. 10B is a constant factor, it does not affect the computational order of the FST.

Figure 11:
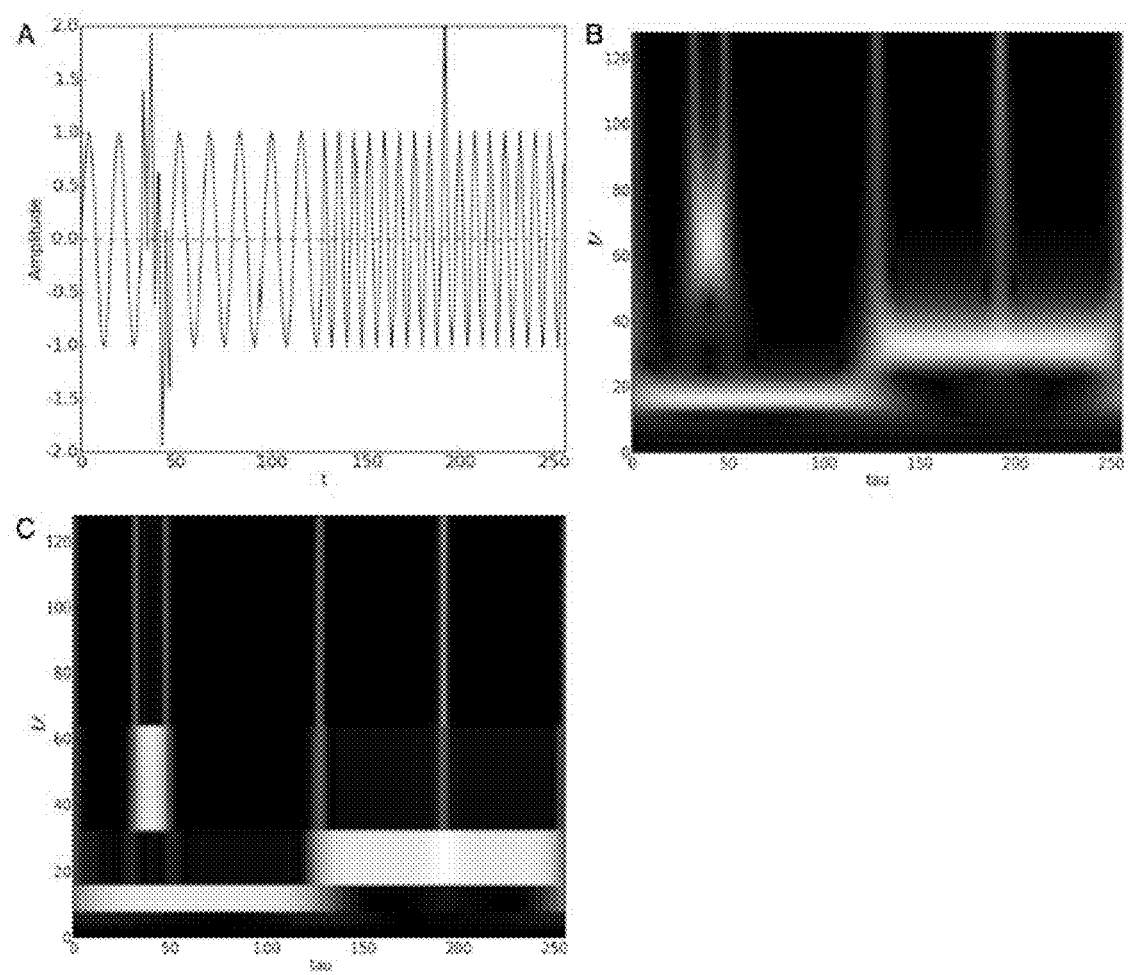
FIGS. 11A-C illustrate another embodiment of a fast S-transform of a sample signal in accordance with the present embodiments.

The result from Algorithm 3 is presented for a sample signal in FIG. 11, along with the corresponding spectrum from the continuous ST. FIG. 11A consisting of a low frequency for the first half of the signal, followed by a higher frequency for the second half A high frequency chirp is present in the middle of the first half of the signal and a delta in the second. FIG. 11B is the magnitude of the positive frequency half of the continuous S-transform of FIG. 11A and FIG. 11C is the magnitude of the positive frequency half of the discrete S-transform of FIG. 11A.

In Algorithm 3, the highest two frequencies (positive and negative) are calculated at the full resolution of the signal. Using dyadic sampling, the next frequencies to be sampled are half the magnitude of the first two. Since the frequency may be lower, the signal may be downsampled (Δt can be increased), if the Nyquist criterion is satisfied. This is accomplished in steps 5 and 6 of Algorithm 3. Since Algorithm 3 uses four points per wavelength instead of two, evaluating the transform with the window centered at every point results in a factor of two oversampling of the τ-axis (FIG. 10B) compared to the discrete wavelet transform.

The Gaussian windows of the ST are infinite in extent but when calculating the transform of a finite length signal, the Gaussians are necessarily multiplied by a boxcar window the width of the signal itself. Therefore, the actual window for any finite length signal is a Gaussian multiplied by a boxcar. This situation is particularly apparent at lower frequencies, where the Gaussians are wider (FIG. 12). FIGS. 12A-D illustrate embodiments of S-transform kernels (gray) and windows at τ=0.5 (black) for ν=1 (FIG. 12A), ν=2 (FIG. 12B), ν=4 (FIG. 12C) and ν=8 (FIG. 12D). Dotted lines indicate the imaginary component of the kernel while solid lines are the real part. Black circles superimposed on the real kernel indicate the sampling positions for the FST. As the frequency increases the number of sampling points required also increases. In the continuous ST, the Gaussian window is scaled with frequency but the boxcar is not. This contrasts with the Morlet wavelet, which, using the general formalism of Eq. (9), can also be defined with a window that is a composite of a Gaussian and a boxcar. However, in the Morlet wavelet the Gaussian and boxcar are scaled together. Scaling of both parts of the window function is a key refinement, as it both produces more consistent windows and significantly decreases the computational complexity of the FST.

According to one embodiment, the signal processor 104 may only compute the sums in step 4 of Algorithm 3 for non-zero points (those that are inside the boxcar window). The boxcar may be wide enough to contain at least one entire wavelength, but the width may not be a multiple of the wavelength. This effectively decreases $W_t$, with the full signal length required only for calculating the DC component, and shorter portions used at higher frequencies. Since the inventors are downsampling in step 6, Δt is smallest at high frequencies and becomes progressively larger at lower frequencies and so the summation operation in step 4 may be over a constant number of points. The examples according to the present embodiments may use 8 points. This reduces the complexity of step 4, which is nested inside two FOR loops, from O(N) to constant complexity: O(C). As an additional benefit, adjusting the width of the boxcar window greatly reduces the number of kernels and windows that may be pre-calculated in steps 2 and 3 of Algorithm 3, since the kernels and windows remain essentially constant while the signal's length and resolution are manipulated.

Algorithm 3 produces a discrete fast S-transform that samples the τ-ν plane in an octave pattern, with the number of τ samples increasing with frequency while the number of ν samples decreases. This sampling scheme produces 2N samples, representing a two times oversampling, compared to the theoretical minimum number of samples. This oversampling, as compared to the DWT, may be used to achieve a globally referenced phase measurement. The phase spectrum requires the use of complex sinusoid basis functions, which may be represented by at least three points (in this case, the inventors use four), and, for complex signals, necessitates the calculation of the negative frequency spectrum, in contrast to the wavelet. However, this oversampling is a constant factor and does not affect the computational complexity of the transform.

The constant term in step 3 of Algorithm 3 is used to widen the Gaussian window slightly. This term is also used in the continuous ST. For c>1 its effect is to smooth out the S-spectrum along the τ-axis, at the expense of temporal resolution. This produces a more intuitive spectrum appearance: for example, a sinusoidal signal appears as a uniform amplitude line in the S-spectrum rather than a line with slightly varying amplitude. As long as c≧1, its value does not affect the invertibility of the transform, and c=1.5 in one example.

The computational complexity of the FST, calculated in the appendix, is O(N log N)—the same as that of the Fourier transform. The storage requirements are O(N), like the FFT and discrete wavelet transforms. Since the FST uses the same Gaussian windows as the ST and these windows are infinite in extent both in the time and frequency domains, the FST basis functions are not orthogonal. However, the Gaussian windows in both domains decay quickly so the spectrum is a reasonable representation, both in frequency and time, of a true localized spectrum, as it is with the continuous ST. In addition, with a computational complexity equal to that of the Fourier transform, the redundant information in the FST is not overly burdensome.

The Inverse Fast S-Transform

A discrete version of the S-transform may be invertible by the same procedure as the inverse continuous ST: summation of the transform space over the τ-axis, producing the Fourier spectrum, which can then be inverse discrete or fast Fourier transformed to obtain the original signal. The inverse discrete and fast Fourier transforms require a coefficient for each integer value of the frequency index variable ν from $$-\frac{\nu_{max}}{2}$$

to $$+\frac{\nu_{max}}{2}.$$

Since the FST uses an octave system along the ν-axis, the missing coefficients may be calculated from known points and a priori information.

Figure 13:
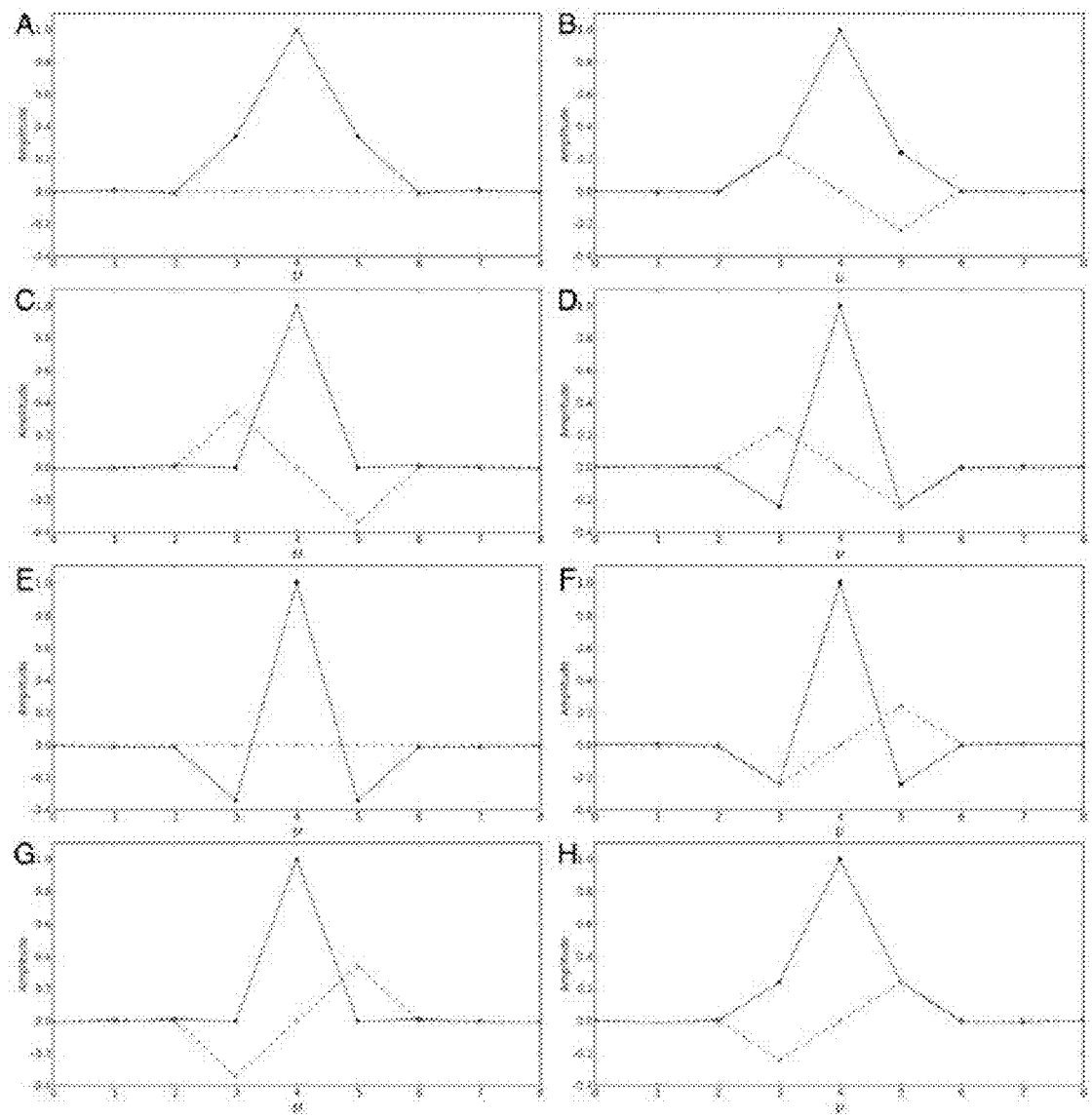
FIGS. 13A-H illustrated embodiments of discrete S-transform window-kernel product in the v-domain for v=4 in accordance with the present embodiments.

Multiplying a signal by a window is equivalent to convolving the Fourier transform of the signal with the Fourier transform of the window. Thus, for a given ν-line in the FST, by examining the Fourier transform of $w(\tau,t,|\nu|)\cdot\phi(t,\nu)$ the inventors can examine the extent and position of the windows in the ν-domain. FIG. 13 shows this for ν=4. Recall from Algorithm 3 that calculating the ν=4 line involves positioning the window at eight locations along τ, and the signal itself has been downsampled to sixteen points (four per wavelength). The effect of moving the window across the signal is to apply a phase ramp to the Fourier transform of the window. In the ST, and for calculated values of ν in the FST, when summed, the ν-space windows interfere and collapse to a delta at a frequency of ν.

For example, FIG. 13 illustrates the discrete S-transform window-kernel product in the ν-domain for ν=4 at τ=0 (A), τ=1 (B), τ=2 (C), τ=3 (D), τ=4 (E), τ=5 (F), τ=6 (G) and τ=7 (H). In this figure dotted lines may indicate the imaginary part while solid lines may indicate the real component and circles may be located at the sampling points. Shifting the window along t may vary the phase in the ν-domain. If each is weighted by the factor $e^{-i2\pi l/\tau}$, the sum may be a delta shifted by 1 and multiplied by the magnitude of (A) at ν+l.

To recover a complete Fourier spectrum from the FST, the ν-domain windows may be weighted so they still sum to a delta, but one that is displaced from ν. This can be done by using a complex sinusoid as the weighting function. Multiplying a ν-line of the FST by a weighting sinusoid with frequency l, then summing, produces the Fourier coefficient for frequency ν+l. The recovered Fourier coefficients may be windowed by the Fourier transform of the time domain window (another Gaussian) meaning the magnitude of the recovered Fourier coefficients is attenuated by an amount $A_{\nu,l}$, equal to the magnitude of the Gaussian window in the ν-domain at frequency ν+l. Dividing by this value provides the correct Fourier coefficient. Note when l=0, $A_{\nu,l}$=1 since the Gaussian windows are normalized.

Certain limits may be observed in this inversion process. Each ν-line has a number of samples that is less than or equal to the number of samples in the original signal, with fewer samples at lower frequencies. The sinusoidal weighting function may satisfy the Nyquist criterion so, for example, the line at ν=4, with eight samples, can be used to calculate only Fourier coefficients ν={0, 1, 2, . . . , 7}. For eight samples, the Nyquist frequency is 4 so for these frequencies −3≦l≦3 and the sampling rate of the ν-line is sufficient. In practice, the range is somewhat less as the ν-space windows decay quickly for higher values of l and may even possess zeros since the signal-space windows are a Gaussian multiplied by a boxcar, which is a Gaussian convolved with a sinc in the ν-domain. From a noise perspective, if two ν-lines both allow the calculation of a particular Fourier coefficient, it is best to use the one that has been attenuated least, i.e., the one with the largest value of $A_{\nu,l}$.

This inversion process is equivalent to performing a Fourier transform on each ν-line in the FST, so it can be accomplished efficiently by fast Fourier transforming each line and weighting the resulting coefficients appropriately. Where there is overlap, the minimum noise coefficients can then be chosen to make up the final Fourier spectrum.

Figure 14:
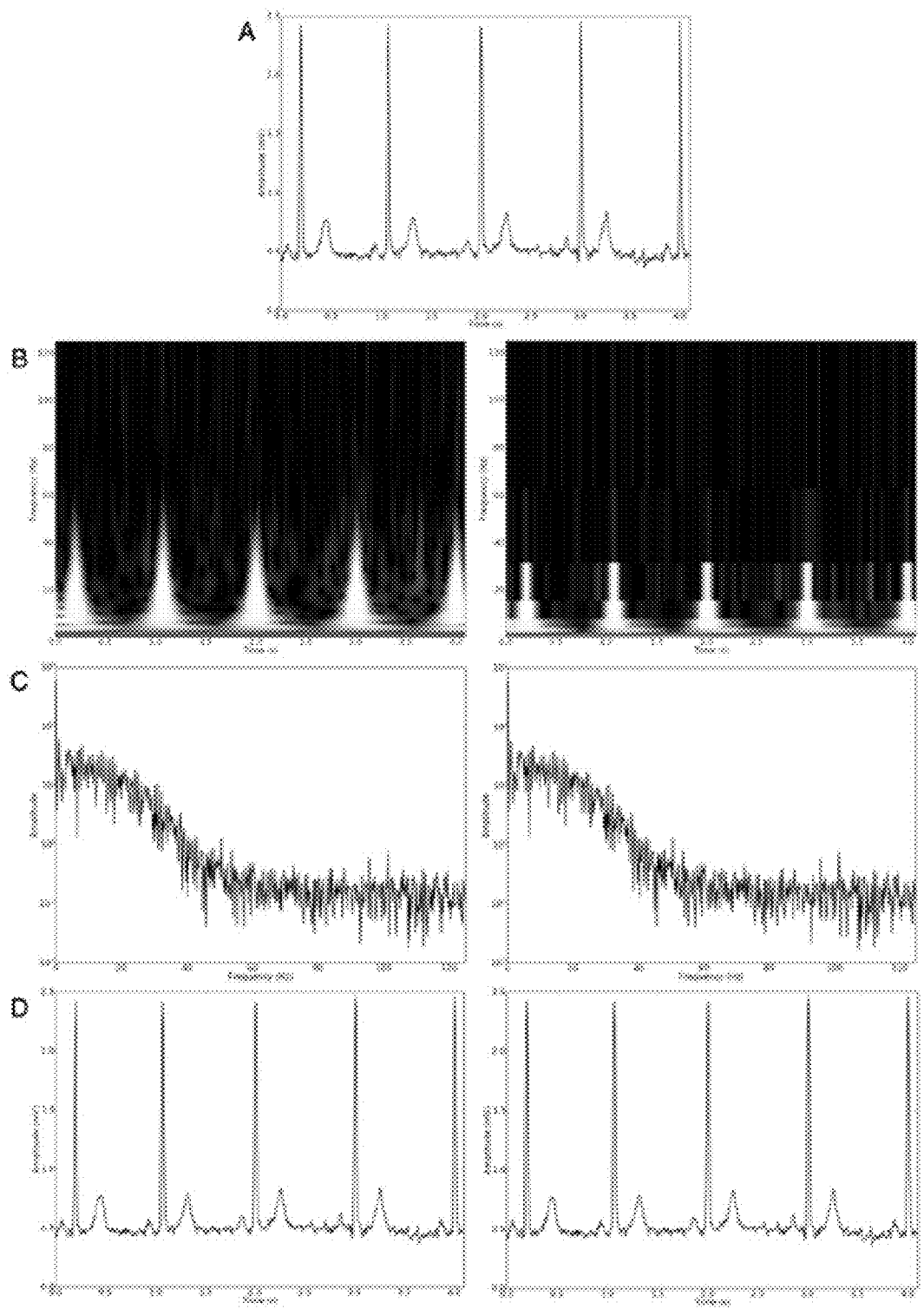
FIGS. 14A-D illustrate a comparison of the ST and FST in accordance with the present embodiments.

FIG. 14 shows the process of transform and inversion for a sample biomedical signal, using both the continuous ST and the FST. The signal (FIG. 14A) is a short electrocardiogram (ECG) recording from a publicly available subset of the European ST-T Database, consisting of the first 512 samples from the V4 lead of record e0103, a 62 year old male subject complaining of mixed angina. This signal was transformed using both the ST and FST, then inverted. The left column shows the results of the ST while the right is from the FST. In FIG. 14B are the magnitudes of the positive frequency halves of the transforms, FIG. 14C shows the magnitude of the Fourier spectra resulting from inversion and FIG. 14D is the signals recovered with the inverse FT. Note that in FIG. 14B frequency is on the vertical axis while in FIG. 14C it is on the horizontal axis. The results of the inversion of both transforms are identical to each other and to the original signal, within machine precision. Though the continuous ST produces a smoother looking spectrum, this difference is illusory—since the same information is contained in both the ST and FST spectra, the smoothness is produced by an interpolation process inherent in the continuous ST oversampling. This is demonstrated by the fact that the original function can be recovered by inverting either dataset.

The Discrete Orthonormal S-Transform

In one embodiment, the basis function of the DOST may be a sum of complex sinusoids multiplied by "frequency shift" and "phase shift" terms. In one embodiment, the frequency shift term can be understood as the kernel and the phase shift term as the τ dependence of the window function. The sum of sinusoids term is equivalent to a boxcar function in the discrete frequency domain. Taking the Fourier transform of this results in an aliased sinc function, i.e. one that contains only frequencies corresponding to the discrete Fourier coefficients. This sinc is the window function for the DOST. In a continuous formulation the boxcar function in the frequency domain is a continuous boxcar and so the window in the time domain is a true sinc function. Though the kernel function of the DOST is the same as that of the ST and FST, the sinc window is a significant departure. It may be better to consider the DOST not as a discrete formulation of the ST, which is defined as using a Gaussian window, but rather as a discrete form of a new transform, the continuous sinc transform (CST), named for the window function.

The use of a sinc window has several consequences. The sinc is infinite in extent but its Fourier pair, the boxcar function, is finite, so DOST basis functions can be constructed which are orthonormal. Interestingly, Stockwell suggests that some redundancy may be desirable and identifies the possibility for non-orthogonal basis functions as a strength of the DOST. Though the DOST window is a very desirable boxcar function in the frequency domain, it is a much less desirable sinc function in the time domain. The sinc has considerably larger side lobes than the Gaussian, and since each sample in the DOST spectrum represents a local region defined by the window, any filtering operations performed on the spectrum will exhibit classic Gibb's ringing in the time-domain. Similarly, localization on the τ-axis of the transform spectrum will suffer, again because of the large sidelobes of the sinc. These may prove to be serious drawbacks in medical applications such as filtering and techniques that examine restricted areas of pathology, such as brain tumors.

The algorithm proposed by Stockwell for calculating the DOST uses the full signal length and resolution for every calculation so its computational complexity is $O(N^2)$ compared to $O(N \log N)$ for the FST. The storage requirements of both the DOST and FST are the same, $O(N)$.

The examples of the FST and DOST suggest the construction of other transforms using the general transform framework. Many functions have been suggested for use as windows in Fourier analysis, and the properties that make these windows desirable in that application are also advantageous in the construction of new time-frequency transforms. For example, a FST analogue can be constructed that replaces the Gaussian window with a Blackmann-Harris window or Hamming window. Windows have been constructed that are specifically designed to be finite but minimize the ringing associated with the boxcar-sinc pair, which allows an orthogonal DOST-like transform with fewer time domain ringing effects. Prolate spheroidal wavefunctions, which can be approximated by Kaiser-Bessel functions, have the smallest simultaneous regions of support in both domains and so may provide maximum simultaneous localization in both the frequency and time domains.

GFT for a Multi-dimensional Signal

GFT for a 2D Signal

When the signal is two-dimensional, its resulting GFT is four-dimensional. Let the signal be written as $s(x_1,x_2)$ and its GFT as $\Psi(\chi_1,\chi_2,k_1,k_2)$, with $\chi_m$ the analogue of $x_m$, and $k_m$ the Fourier conjugate of $x_m$ for m={1,2}, such that $$\Psi(\chi_1, \chi_2, k_1, k_2) = \int_{-\infty}^{+\infty} \int_{-\infty}^{+\infty} s(x_1, x_2) \quad (10)$$
$$w(\chi_1 - x_1, \chi_2 - x_2, k_1, k_2)e^{-2\pi i(k_1 x_1 + k_2 x_2)} dx_1 dx_2$$

It may be assumed that the general window function w(*) is separable, and by extension orthogonal, in $(\chi_m-x_m, k_m)$, i.e., $$w(\chi_1-x_1,\chi_2-x_2,k_1,k_2) \to w_1(\chi_1-x_1,k_1)w_2(\chi_2-x_2,k_2) \quad (11)$$

Note that this is actually not overly restrictive; rather, it ensures that the multi-dimensional GFT be separable along its Cartesian axes, just like the multi-dimensional FT. Analogous to its 1D counterpart, α-space is now synthesized via the 2D-FT of $\Psi(*)$ along the $\chi_m$-axes. Then, by (i) letting $k'_m$ be the Fourier conjugate of $\chi_m$, (ii) substituting Eq. (11) into Eq. (, and (iii) re-ordering terms, we obtain $$\alpha(k'_1, k'_2, k_1, k_2) = \int_{-\infty}^{+\infty} \int_{-\infty}^{+\infty} \Psi(\chi_1, \chi_2, k_1, k_2) \quad (12)$$
$$e^{-2\pi i(k'_1 \chi_1 + k'_2 \chi_2)} d\chi_1 d\chi_2$$
$$= \int_{-\infty}^{+\infty} \int_{-\infty}^{+\infty} w_2(\chi_2 - x_2, k_2)$$
$$e^{-2\pi i(k_2 x_2 + k'_2 \chi_2)}$$
$$\left[ \int_{-\infty}^{+\infty} \int_{-\infty}^{+\infty} s(x_1, x_2) w_1(\chi_1 - x_1, k_1) e^{-2\pi i(k_1 x_1 + k'_1 \chi_1)} dx_1 d\chi_1 \right]$$
$$dx_2 d\chi_2$$

In one embodiment, the square-bracketed term may be expressed, such that $$\alpha(k'_1, k'_2, k_1, k_2) = \int_{-\infty}^{+\infty} \int_{-\infty}^{+\infty} w_2(\chi_2 - x_2, k_2) \quad (13)$$
$$e^{-2\pi i(k_2 x_2 + k'_2 \chi_2)} [W_1(k'_1, k_1) \cdot S_1(k'_1 + k_1, x_2)] dx_2 d\chi_2$$
$$= W_1(k'_1, k_1) \int_{-\infty}^{+\infty} \int_{-\infty}^{+\infty} S_1(k'_1 + k_1, x_2)$$
$$w_2(\chi_2 - x_2, k_2) e^{-2\pi i(k_2 x_2 + k'_2 \chi_2)} dx_2 d\chi_2$$

where $W_1(k'_1,k_1)$ is the FT of $w_1(\chi_1,k_1)$ along the $\chi_1$-axis, and $S_1(k_1,x_2)$ is the FT of $s(x_1,x_2)$ along the $x_1$-axis. Furthermore, Eq. (13) may also be expressed such that $$\alpha(k'_1,k'_2,k_1,k_2)=W_1(k'_1,k_1)[W_2(k'_2,k_2)S_2(k'_1+k_1,k'_2+k_2)] \quad (14)$$

where $W_2(k'_2,k_2)$ is the FT of $w_2(\chi_2,k_2)$ along the $\chi_2$-axis, while $S_2(k'_1+k_1,k_2)$ is the FT of $S_1(k'_1+k_1,x_2)$ along the $x_2$-axis. Of course, $S_2(*) \to S(*)$ since $S_2(*)$ can effectively be recognized as the shifted 2D-FT of $s(x_1,x_2)$, from which we obtain the compact expression described in Eq. (15).

$$\alpha(k'_1,k'_2,k_1,k_2)=W_1(k'_1,k_1)W_2(k'_2,k_2)S(k'_1+k_1,k'_2+k_2) \quad (15)$$

GFT for an M-D Signal

When the signal is M-dimensional, say $s(x_1, \ldots, x_M)$, its GFT is 2M-dimensional, namely $\Psi(\chi_1, \ldots, \chi_M, k_1, \ldots, k_M)$, where $\chi_m$ and $k_m$ are still the analogue and Fourier conjugate of $x_m$, respectively, but with m={1, 2, . . . , M}. In one embodiment, the M-D window function w(*) may imply that $$w(\chi_1-x_1, \ldots, \chi_M-x_M, k_1, \ldots, k_M) \to w_1(\chi_1-x_1,k_1) \ldots$$
$$w_M(\chi_M-x_M,k_M) \quad (16)$$

As demonstrated in the previous subsection, α-space for a 2D signal is a simple extension of its 1D counterpart: effectively the terms are re-arranged to form nested loops of α-space integrals of effective 1D signals. This re-ordering and nesting may be possible because (i) the Fourier transform is both linear and orthogonal, and (ii) the window functions are separable along their orthogonal Cartesian axes. Extending this to M-dimensions, then, it may be shown that the general result $$\alpha(k'_1, \ldots, k'_M, k_1, \ldots, k_M)=W_1(k'_1,k_1) \ldots W_M(k'_M,$$
$$k_M)S(k'_1+k_1, \ldots, k'_M+k_M) \quad (17)$$

where $k'_m$ is the Fourier conjugate of $\chi_m$, $W_m(k'_m,k_m)$ is the FT of $w_m(\chi_m,k_m)$ along the $\chi_m$-axis, and $S(k_1, \ldots, k_M)$ is the M-dimensional FT of $s(x_1, \ldots, x_M)$.

The Fast GFT Algorithm

One inefficiency of the conventional S-transform (and GFT) algorithm is that it is not a one-to-one transform nor does it provide multi-resolution or multi-scale information, in contradistinction to the WT algorithm. This is most apparent from visualizing α-space for a 1D signal whereby each k-line is a shifted version of S(k') multiplied by W(k',k). In such an embodiment, the width of W(k',k) is small at low frequencies, and increases as |k| increases. However, in comparing successive k-lines of a-space, the relative shift of S(k') is just one k'-pixel, and the W(k',k) widths are similar (but not equal).

In one embodiment, W(k',k) may effectively provide a progressive bandpass width over a "block" of S(k'). $\Psi(\chi,k)$ may be calculated via the IFT for blocks whose length is less than that of S(k'). In an embodiment having dyadic sampling in |k|, the block sizes are themselves dyadic, such that the total number of points remains N. In one embodiment, the k'-resolution in each block may remain constant. Therefore, upon IFT, each $\Psi(\chi,k)$ $\chi$-line at a specific k-value has the same extent (i.e., field-of-view) as the original signal, but with different resolution.

For M-dimensional signals, the blocks will of course be M-dimensional, and the dyadic scale will occur in all directions. This "blocking" is easily visualized for M=2, where the centre $(k'_1, k'_2)$-value of each block may also be its $(k_1, k_2)$-value. In one embodiment, the effective 2D weighting function may be $W_1(k'_1, k_1)W_2(k'_2, k_2)$. Extending this beyond 2D may be possible. In one embodiment, the efficient FGFT algorithm involves 4 steps:

1. Take the M-dimensional FT of signal $s(x_1, \ldots, x_M)$ to produce $S(k_1, \ldots, k_M)$
2. Synthesize the M-dimensional, "blocked" weighting function
3. Multiply $S(k_1, \ldots, k_M)$ from Step 1 with the weighting function of Step 2 to get $\alpha(*)$
4. Perform the in-place, M-dimensional IFTs for each block of $\alpha(*)$ in Step 3 to generate the desired transform, $\Psi(*)$ Computational Burden The computational order for the multi-resolution, one-to-one GFT of an M-dimensional signal of size $N_1 \times N_2 \times, \ldots, \times N_M$ may be calculated by investigating the order for each of the four steps required in the algorithm. Step 1 is the M-dimensional FT of the signal, whose order may be known to be $N_1 N_2 \ldots N_M \log(N_1 N_2 \ldots N_M)$. Step 2 can be pre-calculated, and involves the usual memory allocation and related overhead. Step 3 is a point-by-point multiplication of complex function $S(*)$ by the real weighting function, such that its order is $2N_1 N_2 \ldots N_M$. Step 4 involves block-wise IFTs, which can be calculated in-place. To calculate the effective number of operations required, let the number of points in the jth M-block be $P_{1,j} P_{2,j} \ldots P_{M,j}$. Since we have a one-to-one transform, then $$\sum_{j=1}^{B_m} P_{m,j} = N_m$$

for $m=\{1, 2, \ldots, M\}$, where $B_m$ is the number of blocks along the mth dimension. And, let $P_{m,j} = f_{m,j} N_m$ with $f_{m,j} \in (0,1)$ for all m and j, where $f_{m,j}$ represents the fraction of points along dimension m for block j. Thus, we have $$\sum_{j=1}^{B_m} P_{m,j} = N_m \Rightarrow \sum_{j=1}^{B_m} f_{m,j} N_m = N_m \Rightarrow \sum_{j=1}^{B_m} f_{m,j} = 1, \forall m \quad (18)$$

Since the IFT of each $P_{1,j} \ldots P_{M,j}$-block is of computational order $P_{1,j} \ldots P_{M,j} \log(P_{1,j} \ldots P_{M,j})$, and Step 4 requires an IFT for all M-dimensional dyadic blocks, then $$\sum_{j_1=1}^{B_1} \sum_{j_2=1}^{B_2} \ldots \sum_{j_M=1}^{B_M} P_{1,j_1} P_{2,j_2} \ldots P_{m,j_M} \log(P_{1,1} P_{2,2} \ldots P_{m,j_M}) = \quad (19)$$

-continued $$\sum_{j_1=1}^{B_1} \sum_{j_2=1}^{B_2} \ldots \sum_{j_M=1}^{B_M} f_{1,j_1} f_{2,j_2} \ldots f_{M,j_M} N_1 N_2 \ldots N_M$$

$$\log(f_{1,j_1} f_{2,j_2} \ldots f_{M,j_M} N_1 N_2 \ldots N_M) = N_1 N_2 \ldots N_M$$

$$\sum_{j_1=1}^{B_1} \sum_{j_2=1}^{B_2} \ldots \sum_{j_M=1}^{B_M} f_{1,j_1} f_{2,j_2} \ldots f_{M,j_M} \log(f_{1,j_1} f_{2,j_2} \ldots f_{M,j_M}) +$$

$$N_1 N_2 \ldots N_M \log(N_1 N_2 \ldots N_M)$$

$$\sum_{j_1=1}^{B_1} \sum_{j_2=1}^{B_2} \ldots \sum_{j_M=1}^{B_M} f_{1,j_1} f_{2,j_2} \ldots f_{M,j_M}$$

The fractional terms $f_{m,j}$ are within 0 to 1, so the first multi-summation term $\leq 0$, whereas the second multi-summation is unity by invoking Eq. (18) repeatedly. Thus, the order of Step 4 is necessarily $\leq N_1 N_2 \ldots N_M \log(N_1 N_2 \ldots N_M)$. Since the order of the algorithm is the highest order for the 4 steps (namely Step 1), then the computational order of the FGFT algorithm is the same as that for the M-dimensional FFT, i.e., $N_1 N_2 \ldots N_M \log(N_1 N_2 \ldots N_M)$.

Inverse FGFT Algorithm

From the calculated multi-resolution FGFT matrix $\Psi(*)$, the M-dimensional signal can be easily recovered by performing these simple steps:

1. Perform the in-place, M-dimensional FTs for each block of $\Psi(*)$ to generate $\alpha(*)$
2. Synthesize the M-dimensional, "blocked" weighting function
3. Divide $\alpha(*)$ from Step 1 by the weighting function in Step 2 to get $S(k_1, \ldots, k_M)$
4. Take the M-dimensional IFT of $S(k_1, \ldots, k_M)$ in Step 3 to produce signal $s(x_1, \ldots, x_M)$ Since the steps are completely equivalent to the forward FGFT, albeit in reverse order, the computational order/burden of the inverse FGFT is identical to its forward counterpart.

EXAMPLES

Texture Analysis Images

Image analysis techniques usually operate based on the intensity or color of pixels in an image. Texture analysis is a complementary technique that instead measures patterns of intensity or color. One way to measure texture in an image is via the frequency spectrum. For example, fine, detailed textures have frequency spectra with more power in the high frequencies compared to smooth, homogenous textures. The Fast GFT offers a very powerful means of measuring texture as it efficiently produces a frequency spectrum for each pixel in the image.

Figure 15:
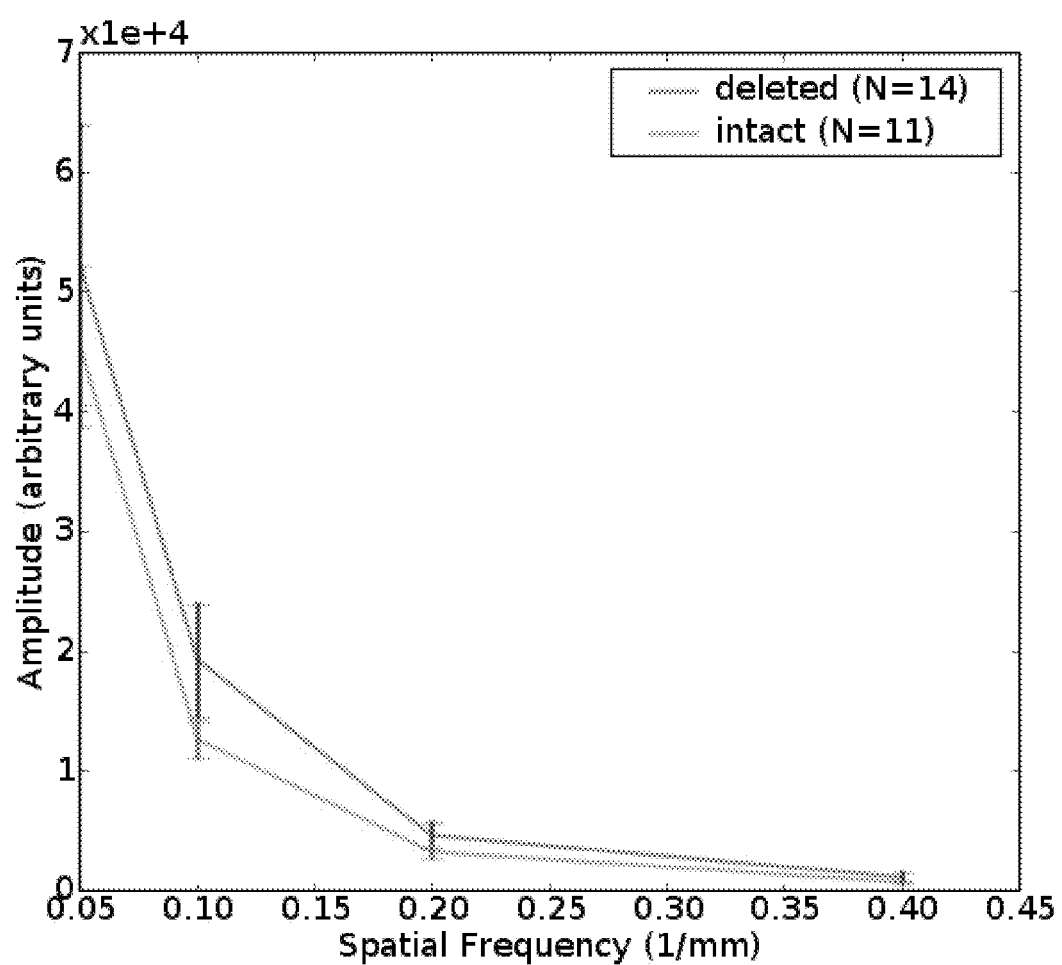
FIG. 15 illustrates one embodiment of a spatial frequency spectra calculated according to the present embodiments.
Figure 16:
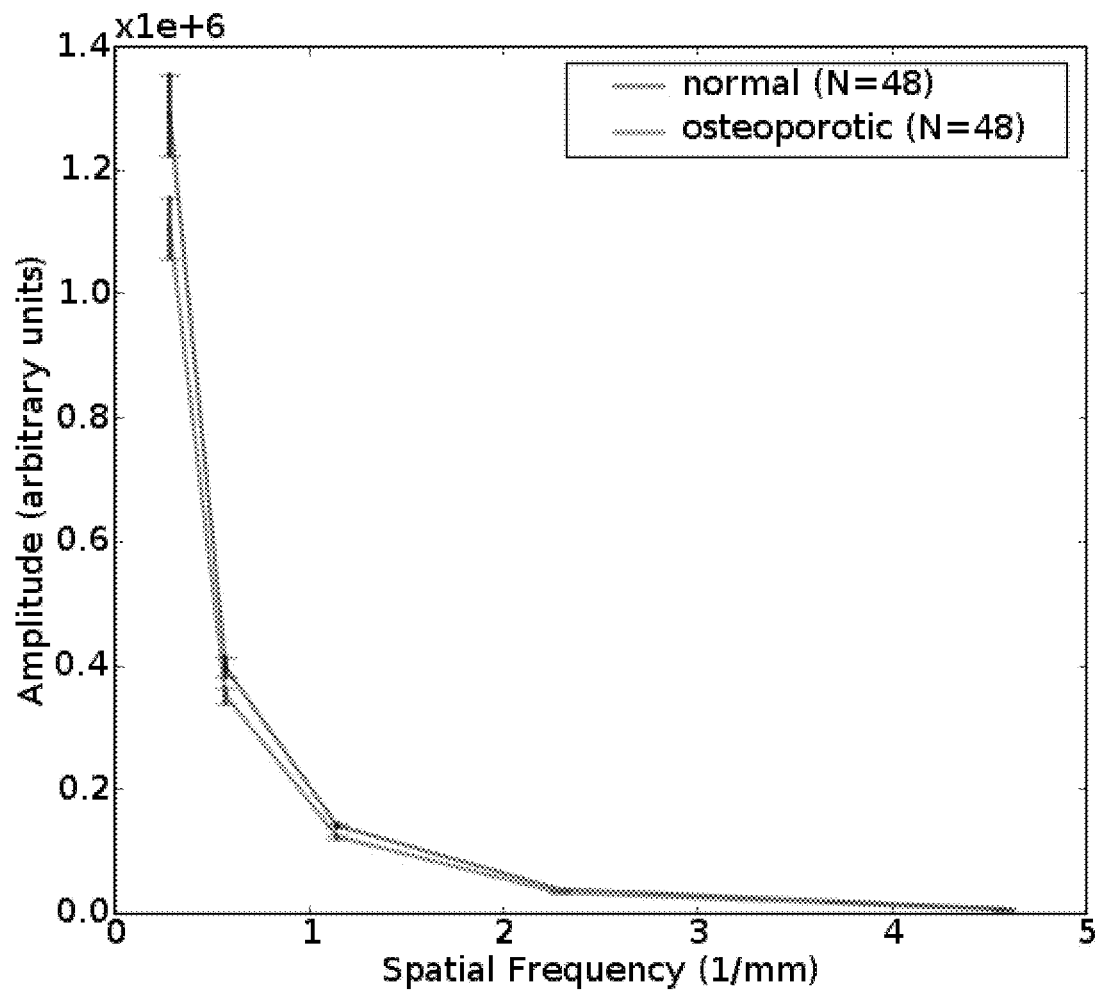
FIG. 16 illustrates one embodiment of a spatial frequency spectra indicating a difference in the texture of CT images of trabecular bone from normal controls and osteoporosis patients calculated according to the present embodiments.

FIG. 15 and FIG. 16 show two applications of texture analysis of medical images. In FIG. 15, patients with a type of brain tumor called oligodendroglioma were scanned using magnetic resonance (MR) imaging. The resulting images were analyzed with the fast GFT to determine any texture differences. Significant differences were discovered between tumors with and without a particular genetic abnormality: deletion of the 1p and 19q chromosomal arms. The presence of this abnormality is known to predict tumors that respond to chemotherapy and are associated with a good response to radiotherapy and good patient prognosis. Fast GFT texture analysis was able to detect 1p/19q deleted tumors with a sensitivity of 93% and specificity of 96%. Radiologists and neurologists examining the same series of images were only able to identify 1p/19q deletion with a sensitivity of 70% and specificity of 63%. By using texture analysis of MR images this important tumor feature can be identified non-invasively, without the need for brain biopsy surgery to obtain tissue samples for genetic analysis.

FIG. 16 demonstrates the same fast GFT texture technique applied to computed tomography (CT) images of the wrist bones of normal, age matched controls and osteoporosis patients. The texture analysis technique was able to identify subjects who would suffer at least one bone fracture before a follow up doctor's appointment with a sensitivity of 82% and specificity of 88%. On the same dataset the gold standard for diagnosis of osteoporosis, dual x-ray absorbtiometry, predicted fractures with a sensitivity of 60% and specificity of 71%.

Sound Analysis

Figure 17:
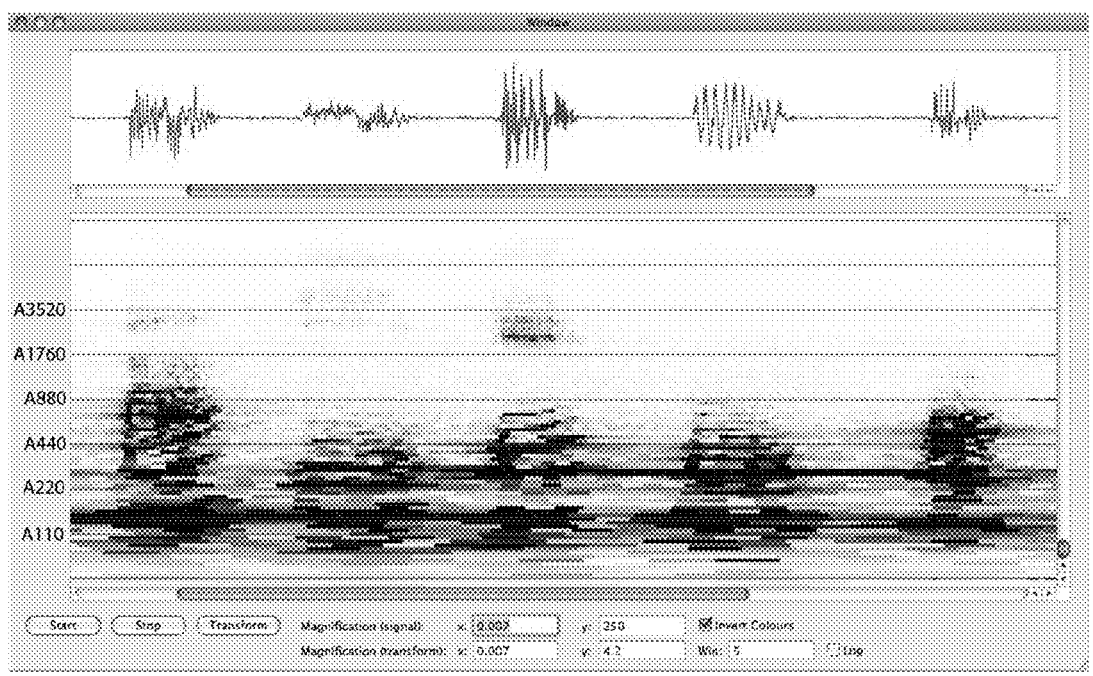
FIG. 17 illustrates one embodiment of a Fast GFT spectrum of an audio recording of a volunteer speaking the English vowel sounds a, e, i, o and u calculated according to the present embodiments.

The fast GFT algorithm produces local frequency spectra very efficiently. The speed of the algorithm makes real-time analysis of many signals possible. An example of this is voice analysis, demonstrated in FIG. 17. In this example, a volunteer was recorded speaking the English vowel sounds a, e, i, o and u. Compact disc (CD) quality audio recording produces 44,100 samples per second. In this example, the fast GFT of each second of CD-quality audio took less than 27 ms, which is more than adequate for real-time analysis. In comparison, the equivalent S-transform algorithm took more than 17 minutes to perform for every second of input recording. Real time spectral audio analysis is critical for applications including voice recognition and automatic dictation.

General Signal Analysis and Filtering

Most acquired signals are non-stationary: their frequency content changes with time. Examples include climate data such as ocean level and wind patterns, seismic signals used in oil and gas exploration and audio and electrical signals acquired for medical diagnosis. Many of these signals have either a high temporal sampling rate or a very long sampling period, both of which result in a great number of data points to be analyzed. In most cases, practical examples of these signals are impossible to transform with the standard S-transform technique, but are easily handled by the fast GFT algorithm. An example is included in FIGS. 8A-C, which shows an electrocardiogram (ECG) signal and its spectrum, obtained via the fast GFT algorithm.

ECG monitoring is routinely conducted over a period of hours. In many cases, as with sound analysis, a real-time spectrum is useful. In others, offline analysis of the entire acquisition is desired. The full ECG acquisition from FIGS. 8A-C is two hours long at a sampling rate of 250 Hz. This signal took less than 1.5 s to transform with the fast GFT algorithm, and the transform occupies 3 MB of memory. Using the standard S-transform algorithm the computation would take more than 27 days and occupy 47 TB of storage space, which is clearly impractical.

Radio Communications

Simple radio transmissions, such as familiar AM and FM radio, begin with a fixed carrier frequency and encode information through modification of that carrier. In the case of AM radio, the amplitude of the carrier is modified. In FM radio, the frequency is changed slightly. In either case, since the frequency does not vary much from the basic carrier frequency, a short time Fourier transform is often adequate to characterize the radio transmission. In contrast, many modern systems use frequency hopping or spread spectrum techniques either to more efficiently utilize the available radio spectrum or to make radio transmissions resistant to eavesdropping. In this case, the frequency content of the transmission varies significantly and a technique offering progressive resolution, such as the fast GFT, may be more useful for analysis of the transmission.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

Appendix A

Derivation of Equation (6)

The α-domain is defined in Eq. (5) as the Fourier transform of $S(\tau,\nu)$ along the $\tau$ axis. That is:

$$\alpha(\nu', \nu) = \mathcal{F}_\tau\{S(\tau, \nu)\} = \int_{-\infty}^{+\infty} S(\tau, \nu) \cdot e^{-2\pi i \tau \nu'} \cdot d\tau \qquad (8)$$

$$= \int_{-\infty}^{+\infty} \left\{ \int_{-\infty}^{+\infty} s(t) \cdot w(\tau - t, \sigma) \cdot e^{-2\pi i t \nu} \cdot dt \right\} \cdot e^{-2\pi i \tau \nu'} \cdot d\tau$$

$$= \int_{-\infty}^{+\infty} s(t) \cdot e^{-2\pi i t \nu} \cdot dt \cdot \int_{-\infty}^{+\infty} w(\tau - t, \sigma) \cdot e^{-2\pi i \tau \nu'} \cdot d\tau$$

$$= \int_{-\infty}^{+\infty} s(t) \cdot e^{-2\pi i t \nu} \cdot dt \cdot \left[ W(\nu', \sigma) \cdot e^{e^{-2\pi i t \nu'}} \right]$$

(Fourier Shift Theorem)

$$= W(\nu', \sigma) \cdot \int_{-\infty}^{+\infty} s(t) \cdot e^{-2\pi i t (\nu + \nu')} \cdot dt$$

$$= F(\nu' + \nu) \cdot W(\nu', \sigma)$$

where $\mathfrak{F}_\tau$ indicates the 1D Fourier transform over the $\tau$ variable and $F(\nu)$ and $W(\nu',\sigma)$ are the Fourier transforms of the signal, $s(t)$, and the window function, $w(\tau,\sigma)$, respectively.

Appendix B

TABLE 1

| Transform | Window<br>$w(t, \tau, \nu)$ | Kernel<br>$\phi(t, \tau, \nu)$ |
| --- | --- | --- |
| Fourier<br>(FT)<br>(Allen and<br>Mills, 2004) | 1 | $e^{-i2\pi\nu t}$ |

TABLE 1-continued

| Transform | Window $w(t, \tau, v)$ | Kernel $\phi(t, \tau, v)$ |
|---|---|---|
| Short-Time Fourier (STFT) (Allen and Mills, 2004) | $\Pi[C \cdot (t-\tau)], \dfrac{|\sigma|}{\sqrt{2\pi}} e^{-\frac{(t-\tau)^2 \sigma^2}{2}}$ | $e^{-i2\pi vt}$ |
| S-Transform (ST) (Stockwell et al., 1996) | $\dfrac{|v|}{\sqrt{2\pi}} e^{-\frac{(t-\tau)^2 v^2}{2}}$ | $e^{-i2\pi vt}$ |
| Sinc Transform | $\dfrac{\sin(vt)}{t}$ | $e^{-i2\pi vt}$ |
| Morlet Wavelet (Goupillaud et al., 1984) | $\sqrt{|v|} \cdot \Pi[v(t-\tau)] \cdot \left(1 + e^{-\sigma^2} - 2e^{\frac{3}{4}\sigma^2}\right)^{\frac{1}{2}} \pi^{\frac{1}{4}} e^{\frac{1}{2}v^2(t-\tau)^2}$ | $e^{i\sigma v(t-\tau)} - e^{\frac{1}{2}\sigma^2}$ |
| Haar Wavelet (Allen and Mills, 2004) | $\sqrt{|v|} \cdot \Pi[v(t-\tau)]$ | $\begin{cases} 1 & 0 \le v(t-\tau) < \frac{1}{2}, \\ -1 & \frac{1}{2} \le v(t-\tau) < 1, \\ 0 & \text{otherwise.} \end{cases} \otimes \text{comb}\left(t, \dfrac{vt}{v_{max}}\right)$ |

Six continuous transforms and their corresponding kernels and windows in the general transform (Eq. 9). The first four rows belong to the Fourier family, using the kernel $e^{-i2\pi vt}$, while the fifth and sixth rows are examples of common wavelet transforms. The Haar wavelet kernel is normally finite in extent but here, for consistency, it is convolved with a comb function to make it periodic. Applying a boxcar window selects one particular period. C and σ are constants that determine the width of the window in the STFT and Morlet wavelet, respectively. ⊗ is the convolution operator. The comb function is defined as $$\text{comb}(t, T) = \sum_{n=-\infty}^{\infty} \delta(t - nT).$$

What is claimed is:

1. A method comprising performing, in a processor, a general time-frequency transform on a dataset associated with a signal according to a fast S-transform having a computational complexity of O(NlogN), where N is the total number of samples in the acquired-dataset.

2. The method of claim 1, further comprising performing the general time-frequency transform on the dataset associated with the signal according to a fast S-transform having a resource usage of O(N).

3. The method of claim 1, where the dataset is associated with a multi-dimensional signal.

4. The method of claim 1, further comprising:
receiving a signal;
sampling the signal to generate an signal dataset;
transforming the signal dataset representation with a fast Fourier transform to obtain the frequency-domain representation;
dividing the frequency-domain into sub-regions;
multiplying each sub-region by a window function;
inverse transforming each sub-region individually with an inverse fast Fourier transform;
arranging the inverse transformed sub-regions to form a representation of the frequency content and changes in frequency content along each axis of the signal dataset; and
generating an output comprising the representation of the time-frequency content.

5. The method of claim 4, further comprising dividing the frequency domain into a plurality of overlapping sub-regions.

6. The method of claim 1, further comprising:
receiving a signal;
sampling the signal to generate an signal dataset;
transforming the signal dataset with a fast Fourier transform to obtain a frequency-domain representation;
dividing the frequency-domain into a high-frequency sub-region and a low-frequency sub-region;
generating a second dataset from an inverse fast Fourier transform of the high-frequency sub-region;
multiplying the second dataset by a complex sinusoid of a predetermined frequency and with the same number of dimensions as the signal dataset to form a third dataset;
selecting a first portion of the third dataset;
multiplying the selected portion of the third dataset by a window function; and
computing a sum of the results of multiplying the selected portion of the third dataset by the window function to obtain the frequency measurement at a predetermined sample location in the signal dataset.

7. The method of claim 6, further comprising repeating the steps of claim 6 with a second selected portion of the third data set to obtain the frequency measurements at one or more additional frequencies the signal dataset.

8. The method of claim 7, further comprising:
selecting the low frequency sub-region from as the frequency-domain data;
generating a second dataset from an inverse fast Fourier transform of the low-frequency sub-region;
multiplying the second dataset by a complex sinusoid of a predetermined frequency and with the same number of dimensions as the signal dataset to form a fourth dataset;

selecting a first portion of the fourth dataset;
multiplying the selected portion of the fourth dataset by a window function;
computing, processor, a sum of the results of multiplying the selected portion of the fourth dataset by the window function to obtain the frequency measurement at a predetermined sample location in the signal dataset;
repeating steps with a second selected portion of the fourth data set to obtain the frequency measurements at one or more additional frequencies the signal dataset; and
arranging the resultant data to form a representation of the frequency content and changes in frequency content along each axis of the acquired dataset.

9. A system comprising a signal processor suitably configured to perform a general time-frequency transform on a dataset associated with a signal according to a fast S-transform having a computational complexity of O(N log N) and resource usage of O(N), where N is the total number of samples in the acquired-dataset.

10. The system of claim 9, where the signal processor is further configured to performing the general time-frequency transform on the dataset associated with the signal according to a fast S-transform having a resource usage of O(N).

11. The system of claim 9, where the dataset is associated with a multi-dimensional signal.

12. The system of claim 9, further comprising:
a signal receiver coupled to the signal processor, the signal receiver configured:
to receive a signal; and
sample the signal to generate an signal dataset.

13. The system of claim 12, the signal processor further configured to:
transform the signal dataset representation with a fast Fourier transform to obtain the frequency-domain representation;
divide the frequency-domain into sub-regions;
multiply each sub-region by a window function;
inverse transform each sub-region individually with an inverse fast Fourier transform;
arrange the inverse transformed sub-regions to form a representation of the frequency content and changes in frequency content along each axis of the signal dataset; and
generate an output comprising the representation of the frequency content.

14. The system of claim 13, the signal processor further configured to divide the frequency domain into a plurality of overlapping sub-regions.

15. The system of claim 12, the signal processor further configured to:
transform the signal dataset with a fast Fourier transform to obtain a frequency-domain representation;
divide the frequency-domain into a high-frequency sub-region and a low-frequency sub-region;
generate a second dataset from an inverse fast Fourier transform of the high-frequency sub-region;
multiply the second dataset by a complex sinusoid of a predetermined frequency and with the same number of dimensions as the signal dataset to form a third dataset;
select a first portion of the third dataset;
multiply the selected portion of the third dataset by a window function; and
compute a sum of the results of multiplying the selected portion of the third dataset by the window function to obtain the frequency measurement at a predetermined sample location in the signal dataset.

16. The system of claim 15, the signal processor further configured to repeat the steps of claim 10 with a second selected portion of the third data set to obtain the frequency measurements at one or more additional frequencies the signal dataset.

17. The system of claim 16, the signal processor further configured to:
select the low frequency sub-region from as the frequency-domain data;
generate a second dataset from an inverse fast Fourier transform of the low-frequency sub-region;
multiply the second dataset by a complex sinusoid of a predetermined frequency and with the same number of dimensions as the signal dataset to form a fourth dataset;
select a first portion of the fourth dataset;
multiply the selected portion of the fourth dataset by a window function; and
compute a sum of the results of multiplying the selected portion of the fourth dataset by the window function to obtain the frequency measurement at a predetermined sample location in the signal dataset;
repeat steps with a second selected portion of the fourth data set to obtain the frequency measurements at one or more additional frequencies the signal dataset; and
arrange the resultant data to form a representation of the frequency content and changes in frequency content along each axis of the acquired dataset.

* * * * *